(12) United States Patent
Yoshii et al.

(10) Patent No.: US 11,520,359 B2
(45) Date of Patent: Dec. 6, 2022

(54) PRESSURE CONTROL UNIT AND LIQUID DISCHARGE DEVICE INCLUDING PRESSURE CONTROL UNIT

(71) Applicant: CANON KABUSHIKI KAISHA, Tokyo (JP)

(72) Inventors: Kazuya Yoshii, Yokohama (JP); Koichi Kubo, Yokohama (JP); Naozumi Nabeshima, Tokyo (JP); Soji Kondo, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 499 days.

(21) Appl. No.: 16/774,564

(22) Filed: Jan. 28, 2020

(65) Prior Publication Data

US 2020/0249705 A1     Aug. 6, 2020

(30) Foreign Application Priority Data

Feb. 6, 2019    (JP) .............................. JP2019-019538

(51) Int. Cl.
*B41J 2/17*     (2006.01)
*G05D 16/08*    (2006.01)
*B41J 2/175*    (2006.01)

(52) U.S. Cl.
CPC .......... *G05D 16/08* (2013.01); *B41J 2/17513* (2013.01); *B41J 2/17556* (2013.01); *B41J 2/17596* (2013.01); *B41J 2/175* (2013.01); *B41J 2/17509* (2013.01); *B41J 2/17553* (2013.01)

(58) Field of Classification Search
CPC ... G05D 16/08; B41J 2/17513; B41J 2/17556; B41J 2/17596; B41J 2/175; B41J 2/17509; B41J 2/17553; B41J 2/18

USPC ............ 141/25; 137/113, 205.5, 448, 505.38
See application file for complete search history.

(56) References Cited

U.S. PATENT DOCUMENTS

| | | | | |
|---|---|---|---|---|
| 4,807,582 A | * | 2/1989 | Tuckey ................ | B60K 15/077 123/514 |
| 5,415,146 A | * | 5/1995 | Tuckey ................ | F02M 37/106 137/113 |
| 5,923,353 A | * | 7/1999 | Boyd ................... | B41J 2/17513 347/85 |
| 9,327,513 B2 | * | 5/2016 | Moriguchi ................. | B41J 2/18 |
| 9,333,758 B2 | * | 5/2016 | Koshikawa ............ | B41J 2/1752 |

(Continued)

FOREIGN PATENT DOCUMENTS

JP     2017-124620 A     7/2017

*Primary Examiner* — Minh Q Le
(74) *Attorney, Agent, or Firm* — Canon U.S.A., Inc. IP Division

(57) ABSTRACT

A pressure control unit includes a liquid storage chamber, an inflow port that allows the liquid to flow therein, and an outflow port that allows the liquid to flow out thereof, the pressure control unit controlling pressure of the liquid, wherein at least part of an outer wall of the liquid storage chamber is formed of a flexible film, a pressing plate that presses the flexible film, an urging member that urges the pressing plate, and a valve that opens and closes the outflow port. The pressing plate moves in a direction of expanding the liquid storage chamber, whereby the valve in contact with the pressing plate moves and makes a valve opening degree of the outflow port high. A range of motion of the valve when making the valve opening degree of the outflow port high is limited by a member other than the pressing plate.

11 Claims, 17 Drawing Sheets

(56) References Cited

U.S. PATENT DOCUMENTS

| | | | | |
|---|---|---|---|---|
| 9,358,803 | B2* | 6/2016 | Moriguchi | B41J 2/175 |
| 9,914,308 | B2* | 3/2018 | Yamada | B41J 2/17563 |
| 9,975,340 | B2* | 5/2018 | Karita | B41J 2/155 |
| 2002/0024573 | A1* | 2/2002 | Hoen | B41J 2/19 |
| | | | | 347/85 |
| 2010/0110119 | A1* | 5/2010 | Taga | B08B 9/00 |
| | | | | 347/85 |
| 2016/0001567 | A1* | 1/2016 | Okuno | B41J 2/17509 |
| | | | | 347/85 |
| 2019/0100024 | A1* | 4/2019 | Yamada | B41J 2/165 |
| 2022/0032643 | A1* | 2/2022 | Eto | B41J 2/175 |
| 2022/0063288 | A1* | 3/2022 | Kondo | B41J 2/17513 |

* cited by examiner

FIRST CIRCULATION FORM
- FIG.4A STANDBY STATE 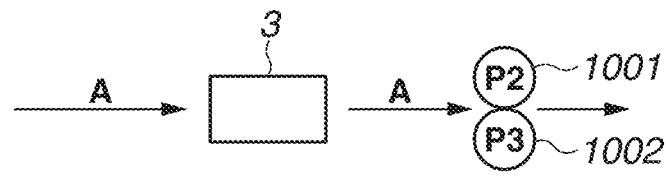
- FIG.4B ALL-DISCHARGE STATE 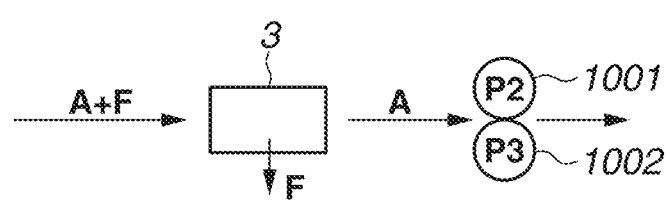
SECOND CIRCULATION FORM
- FIG.4C STANDBY STATE 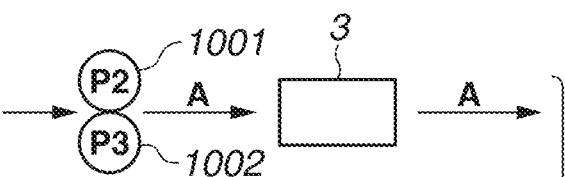
- FIG.4D ALL-DISCHARGE STATE 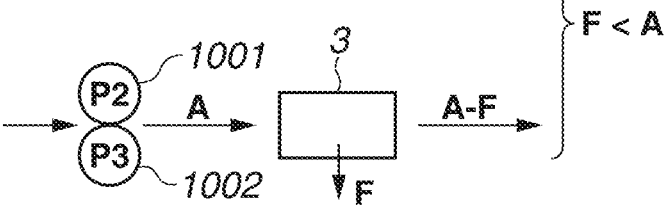
  $F < A$
- FIG.4E STANDBY STATE 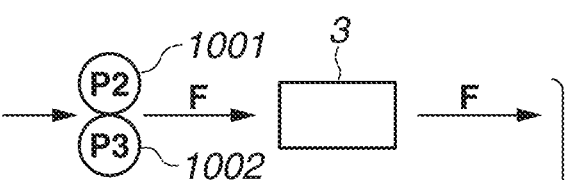
- FIG.4F ALL-DISCHARGE STATE 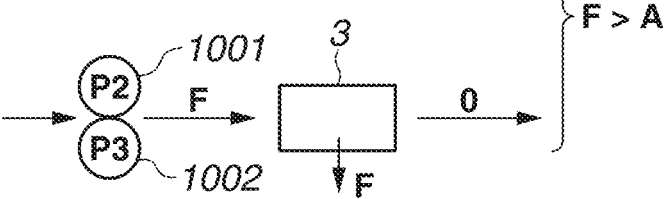
  $F > A$

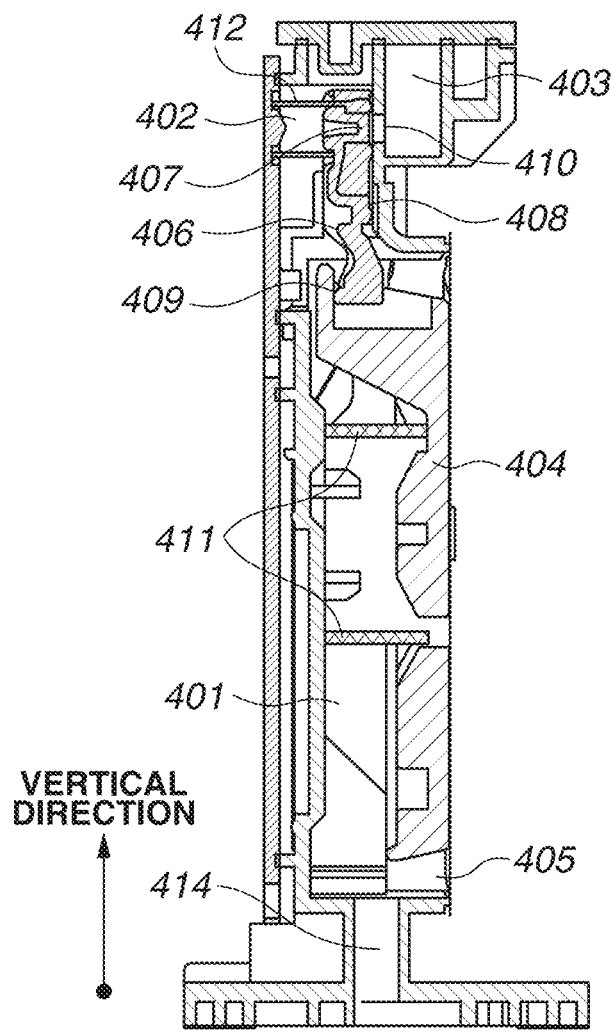
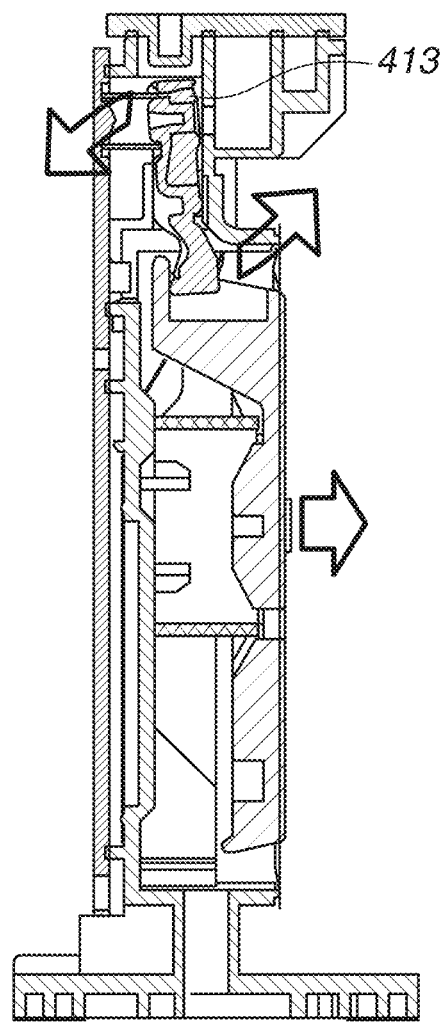

FIG.15A
FIG.15B
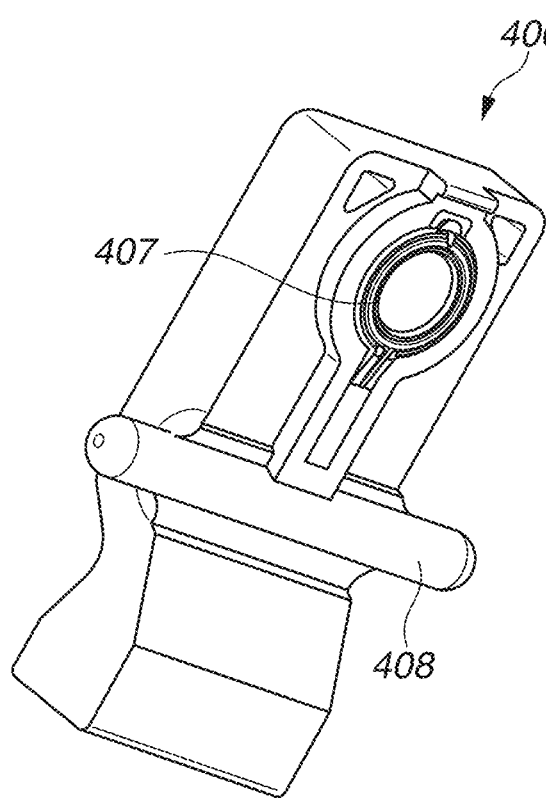
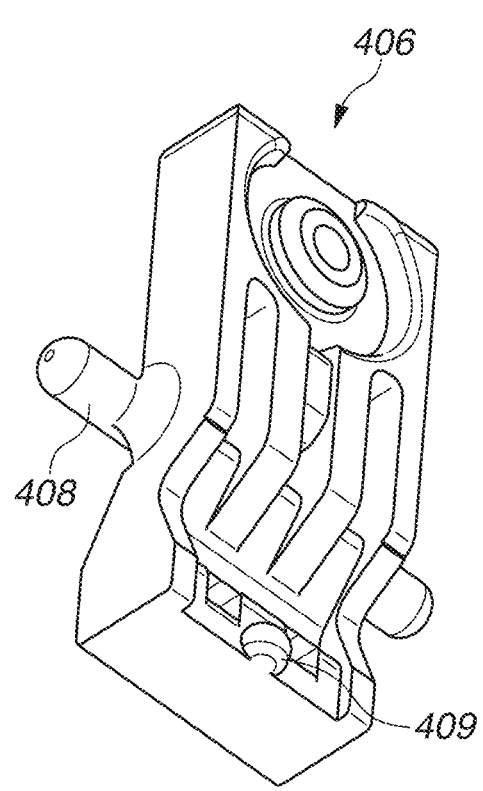

PRESSURE CONTROL UNIT AND LIQUID DISCHARGE DEVICE INCLUDING PRESSURE CONTROL UNIT

BACKGROUND OF THE INVENTION

Field of the Invention

The present disclosure relates to a pressure control unit and a liquid discharge device including a pressure control unit.

Description of the Related Art

In a liquid discharge device typified by that of an inkjet recording apparatus, there is a case where a pressure control unit for adjusting pressure of liquid is used. In a liquid discharge device discussed in Japanese Patent Application Laid-Open No. 2017-124620, a pressure control unit controls the pressure of liquid to create a flow of liquid having a pressure difference (differential pressure), and further generates the flow of liquid using the differential pressure. The flow of liquid can circulate the liquid in a liquid discharge head. This prevents the liquid from thickening in the liquid discharge head.

The pressure control unit discussed in Japanese Patent Application Laid-Open No. 2017-124620 is built into a flow channel of the liquid discharge device, and the liquid also flows inside the pressure control unit. A flow channel in the pressure control unit is opened or closed using a valve, thereby adjusting pressure by a degree of opening the valve (flow channel). In the pressure control unit discussed in Japanese Patent Application Laid-Open No. 2017-124620, the valve is formed integrally with a flexible film forming part of an outer wall of a pressure chamber (liquid storage chamber), and is configured to be movable in conjunction with an increase or a decrease in an inner volume of the pressure chamber. More specifically, the valve moves in conjunction with the increase or the decrease in the inner volume of the pressure chamber, whereby the flow channel is opened or closed. The pressure is controlled by the degree of opening of the valve at this time.

SUMMARY OF THE INVENTION

According to an aspect of the present disclosure, a pressure control unit includes a liquid storage chamber configured to store liquid, an inflow port configured to allow the liquid to flow into the liquid storage chamber, and an outflow port configured to allow the liquid to flow out of the liquid storage chamber, the pressure control unit controlling pressure of the liquid, wherein at least part of an outer wall of the liquid storage chamber is formed of a flexible film, a pressing plate configured to press the flexible film in a direction of expanding the liquid storage chamber, an urging member configured to urge the pressing plate in a direction in which the pressing plate presses the flexible film, and a valve configured to open and close the outflow port, wherein the pressing plate presses the flexible film and moves in the direction of expanding the liquid storage chamber, whereby the valve in contact with the pressing plate moves and makes a valve opening degree of the outflow port high, and wherein a range of motion of the valve when making the valve opening degree of the outflow port high is limited by a member other than the pressing plate.

Further features of the present disclosure will become apparent from the following description of exemplary embodiments with reference to the attached drawings.

BRIEF DESCRIPTION OF THE DRAWINGS

FIGS. 4A, 4B, 4C, 4D, 4E, and 4F are diagrams illustrating an inflow of ink to a liquid discharge head.
FIGS. 14A and 14B are diagrams illustrating the pressure control unit.
FIGS. 15A and 15B are diagrams illustrating a valve.

DESCRIPTION OF THE EMBODIMENTS

The valve of the pressure control unit discussed in Japanese Patent Application Laid-Open No. 2017-124620 is integrated with the flexible film. If the flexible film moves, the valve moves similarly to the flexible film by following the flexible film. Based on consideration by the present inventors, in such a configuration, motion of the valve is likely to be influenced by the flexible film. Depending on a state of the flexible film, there is a case where the valve does not make a desired motion and cannot perform a favorable pressure control. More specifically, due to an influence of stiffness of the flexible film or a crease or wrinkle of the flexible film, there is a case where the flexible film makes a motion different from a desired motion. For example, there is a case where the flexible film moves in a direction inclined toward the vertical direction whereas the flexible film is originally desired to move in parallel to a vertical direction. Also in this case, the valve moves by following the flexible film as it is and similarly moves in the direction inclined toward the vertical direction. If the valve makes such a motion, the valve becomes more inclined than a predetermined orientation, and the degree of opening of the valve changes. As a result, it is difficult to control the liquid to have a desired pressure. If the pressure of the liquid cannot be accurately controlled, for example, desired liquid circulation may not be performed, and the liquid may thicken. This may influence discharge of the liquid.

The present disclosure is directed to providing a pressure control unit that performs a pressure control using a flexible film and a valve so that a control of the pressure of liquid using the valve is unlikely to be influenced by the flexible film.

An exemplary embodiment of the present disclosure will be described below with reference to the drawings. In the description below, a pressure control unit applied to a liquid discharge device is used as an example of the pressure control unit. However, the pressure control unit according to the exemplary embodiment of the present disclosure is not limited to that used in the liquid discharge device.

<Liquid Discharge Device>

Figure 1:
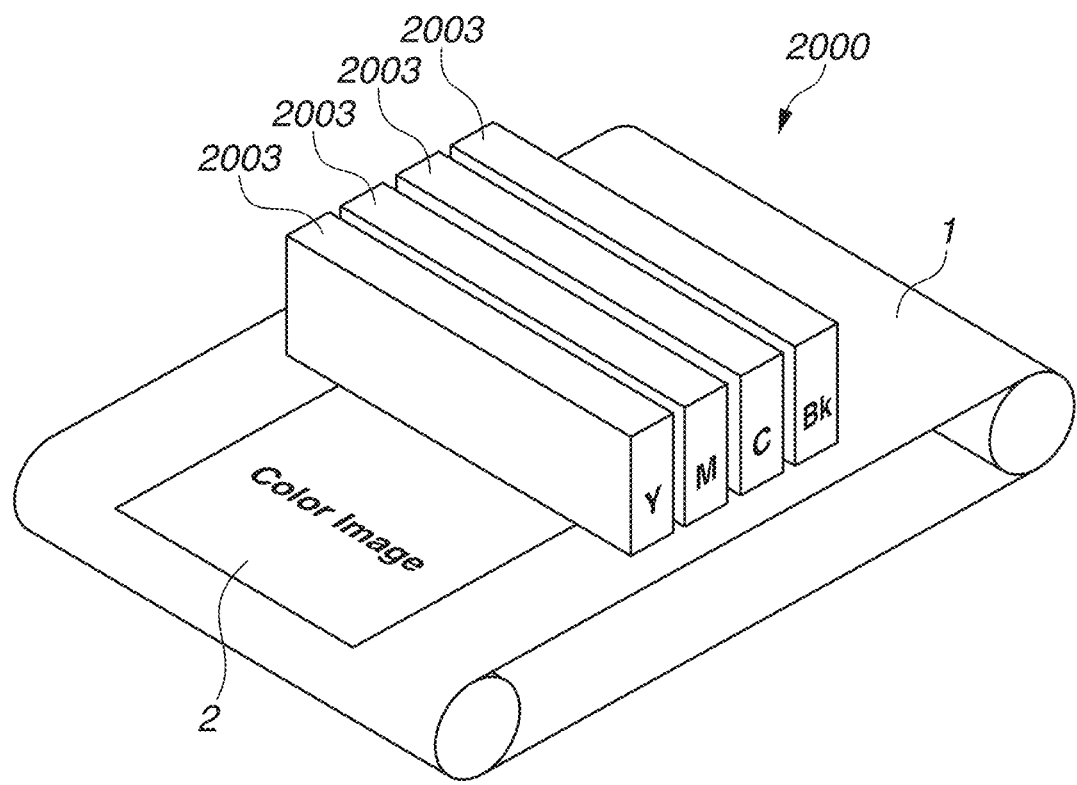
FIG. 1 is a diagram illustrating a liquid discharge device.

FIG. 1 is a diagram illustrating a liquid discharge device 2000 that performs recording by discharging liquid. The liquid discharge device 2000 performs full-color recording on a recording medium by placing four single-color liquid discharge heads 2003 corresponding to ink (liquid) of cyan (C), magenta (M), yellow (Y), and black (Bk) in parallel. Each of the liquid discharge heads 2003 is hydraulically connected to a supply system of the liquid discharge device 2000, a buffer tank 1003 (see FIGS. 2 and 3), and a main tank 1006 (see FIGS. 2 and 3). The liquid discharge head 2003 is electrically connected to an electric control unit that transmits power and a discharge control signal to the liquid discharge head 2003.

The liquid discharge device has a form in which liquid such as ink is circulated between tanks and a liquid discharge head 3. The form of circulation includes a first circulation form in which the liquid is circulated by causing two circulation pumps (for a high pressure and for a low pressure) to operate downstream of the liquid discharge head 3, and a second circulation form in which the liquid is circulated by causing two circulation pumps (for a high pressure and for a low pressure) to operate upstream of the liquid discharge head 3. The first and second circulation forms of the circulation are described below.

<First Circulation Form>

Figure 2:
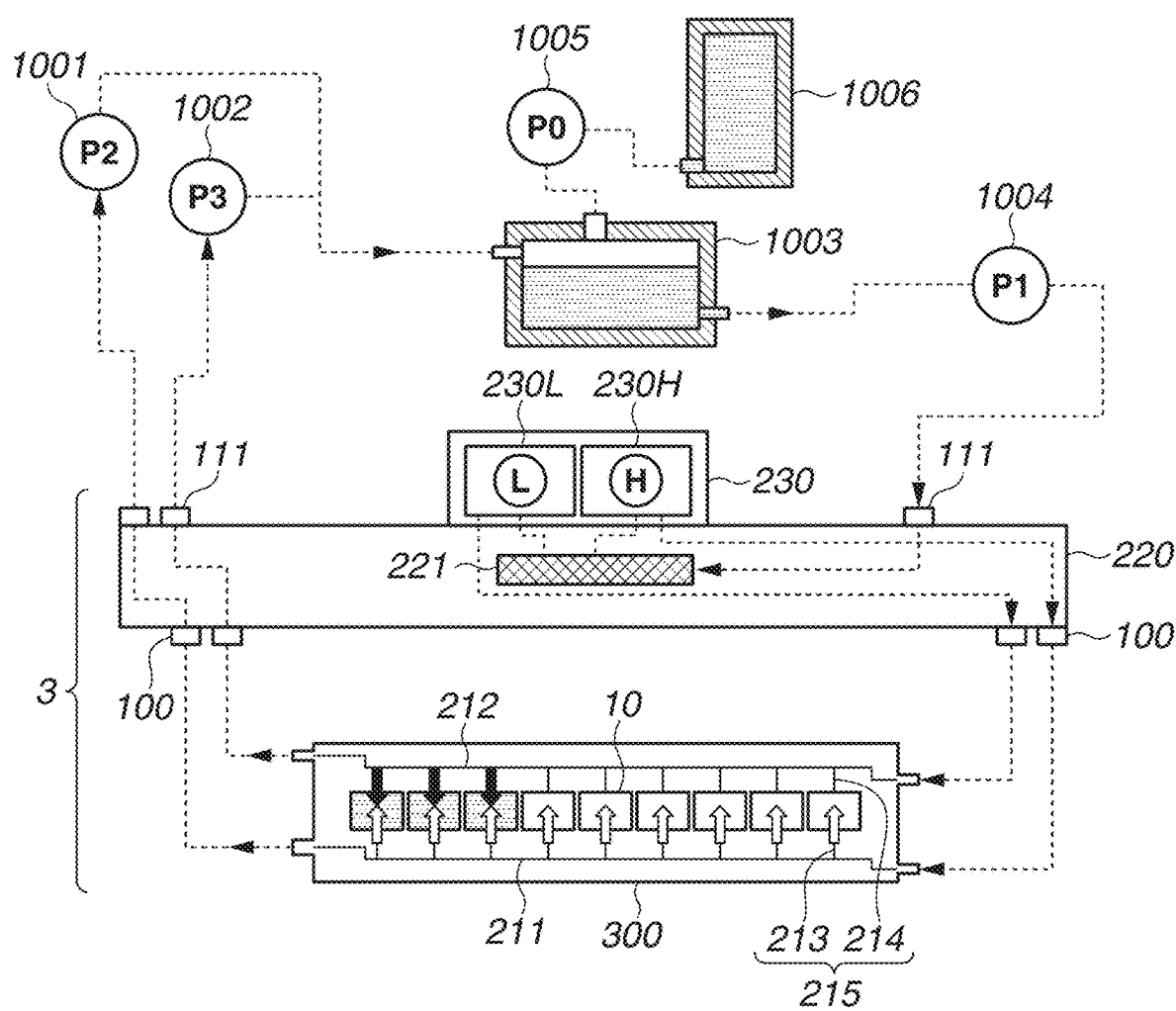
FIG. 2 is a diagram illustrating a circulation form of a liquid discharge device.

FIG. 2 is a diagram schematically illustrating the first circulation form of a circulation path applied to a liquid discharge device 1000 (the liquid discharge device 2000 in FIG. 1). The liquid discharge head 3 is hydraulically connected to a first circulation pump (for a high pressure) 1001, a first circulation pump (for a low pressure) 1002, and a buffer tank 1003. To simplify a description, FIG. 2 illustrates only a path through which ink of one of cyan (C), magenta (M), yellow (Y), and black (Bk) flows. However, in actuality, circulation paths corresponding to four colors are provided in the liquid discharge head 3 and a main body of a recording apparatus.

In the first circulation form, ink stored in the main tank 1006 is supplied to the buffer tank 1003 by a replenishing pump 1005. Then, the ink is supplied through a liquid connection portion 111 to a liquid supply unit 220 of the liquid discharge head 3 by a second circulation pump 1004. The main tank 1006 and the buffer tank 1003 store recording liquid. The ink adjusted to two different pressures (high pressure and low pressure) by a pressure control unit 230 connected to the liquid supply unit 220 separately circulates through two flow channels for the high pressure and for the low pressure. The ink in the liquid discharge head 3 circulates within the liquid discharge head 3 by action of the first circulation pump (for the high pressure) 1001 and the first circulation pump (for the low pressure) 1002 located downstream of the liquid discharge head 3. Then, the ink is discharged from the liquid discharge head 3, and returns to the buffer tank 1003. The first circulation pumps 1001 and 1002, the second circulation pump 1004, and the pressure control unit 230 correspond to a circulation mechanism in the first circulation form.

The buffer tank 1003, which is a sub-tank, is connected to the main tank 1006. The buffer tank 1003 includes an atmosphere communicating port (not illustrated) that communicates between the inside and the outside of the tank 1003, and can discharge air bubbles in the ink to the outside. Between the buffer tank 1003 and the main tank 1006, the replenishing pump 1005 is provided. The replenishing pump 1005 transfers the ink from the main tank 1006 to the buffer tank 1003 to compensate for ink consumed by discharging (ejecting) the ink from a discharge port of the liquid discharge head 3, in performing recording or suction recovery.

The two first circulation pumps 1001 and 1002 draw liquid from liquid connection portions 111 of the liquid discharge head 3 and cause the liquid to flow to the buffer tank 1003. As each of the first circulation pumps 1001 and 1002, a positive displacement pump having a quantitative liquid delivery ability is desirable. More specifically, examples of the positive displacement pump include a tube pump, a gear pump, a diaphragm pump, and a syringe pump. However, a form may be employed in which, for example, a general constant flow valve or a relief valve is disposed in an outlet of the pump to ensure a constant flow rate. It is also desirable to use another form in which a flow rate sensor is provided in the circulation path, and based on an output value of the sensor, a control circuit in the main body controls the number of revolutions of the pump to ensure a constant flow rate. When the liquid discharge head 3 is driven, the first circulation pump (for the high pressure) 1001 and the first circulation pump (for the low pressure) 1002 are operated, whereby ink at a predetermined flow rate flows inside a common supply flow channel 211 and a common collection flow channel 212. The ink flows in this way, thereby maintaining temperature of the liquid discharge head 3 when performing recording at an optimum temperature. It is desirable to set the predetermined flow rate, when the liquid discharge head 3 is driven, to be greater than or equal to a flow rate that enables a temperature difference between recording element substrates 10 in the liquid discharge head 3 to be maintained to an extent not influencing a recording image quality. However, if an excessively large flow rate is set, due to an influence of a pressure drop in the flow channels in a liquid discharge unit 300, a negative pressure difference between the recording element substrates 10 becomes great, and density unevenness in an image occurs. Thus, it is desirable to set the flow rate taking into account the temperature difference and the negative pressure difference between the recording element substrates 10.

The pressure control unit 230 is provided in a path between the second circulation pump 1004 and the liquid discharge unit 300. Even if the flow rate of ink in a circulation system fluctuates due to a difference in a discharge amount per unit area, the pressure control unit 230 operates to maintain the pressure on the downstream side of the pressure control unit 230 (i.e., on the liquid discharge unit 300 side) at a constant pressure set in advance. Two pressure adjustment mechanisms included in the pressure control unit 230 can control the pressure downstream of the pressure control unit 230 to have a fluctuation within a certain range centered on a desired control pressure. In the circulation path, the second circulation pump 1004 pressurizes the upstream side of the pressure control unit 230 via the liquid supply unit 220. This can reduce an influence of a hydraulic head pressure of the buffer tank 1003 on the liquid discharge head 3. Thus, it is possible to increase flexibility in layout of the buffer tank 1003 in the liquid discharge device 1000.

The second circulation pump 1004 may be any pump having a lifting pressure higher than or equal to a certain pressure in the range of an ink circulation flow rate used when the liquid discharge head 3 is driven. A turbo pump or a positive displacement pump may be used. More specifically, a diaphragm pump is applicable. Further, instead of the second circulation pump 1004, for example, a hydraulic head tank placed with a certain hydraulic head difference from the pressure control unit 230 is also applicable. As illustrated in FIG. 2, the pressure control unit 230 includes the two pressure adjustment mechanisms each set to the control pressure different from the other. Between the two negative pressure adjustment mechanisms, a negative pressure adjustment mechanism on the relatively high pressure setting side (230H in FIG. 2) and a negative pressure adjustment mechanism on the relatively low pressure setting side (230L in FIG. 2) are respectively connected, via the inside of the liquid supply unit 220, to the common supply flow channel 211 and the common collection flow channel 212 in the liquid discharge unit 300. The liquid discharge unit 300 includes the common supply flow channel 211, the common collection flow channel 212, and individual flow channels 215 (including an individual supply flow channel 213 and an individual collection flow channel 214) that communicate with the recording element substrates 10. The common supply flow channel 211 is connected to the pressure adjustment mechanism 230H, and the common collection flow channel 212 is connected to the pressure adjustment mechanism 230L. Thus, a differential pressure occurs between the two common flow channels. The plurality of individual flow channels 215 connects one of the pair of common flow channels, i.e., the common supply flow channel 211, with the other of the common flow channels, i.e., the common collection flow channel 212, and respectively communicates with a plurality of discharge ports 13 of the recording element substrates 10. In such a configuration, flows (arrows in FIG. 2) of part of the liquid that flow from the common supply flow channel 211 to the common collection flow channel 212 through internal flow channels of the recording element substrates 10 occur.

In this manner, in the liquid discharge unit 300, the flows in which the liquid flows through the inside of each of the common supply flow channel 211 and the common collection flow channel 212 while the part of the liquid passes through the recording element substrates 10 occur. Thus, it is possible to discharge heat generated in the recording element substrates 10 to the outside of the recording element substrates 10 by the ink flowing through the common supply flow channel 211 and the common collection flow channel 212. In such a configuration, when the liquid discharge head 3 performs recording, it is possible to cause the ink to flow in a discharge port or a pressure chamber that is not discharging the liquid. Accordingly, viscosity of the ink thickened in the discharge port can be reduced, whereby it is possible to prevent the ink from thickening. Further, it is possible to discharge thickened ink and a foreign substance in the ink to the common collection flow channel 212. Thus, the liquid discharge head 3 can perform recording with high image quality at high speed.

<Second Circulation Form>

Figure 3:
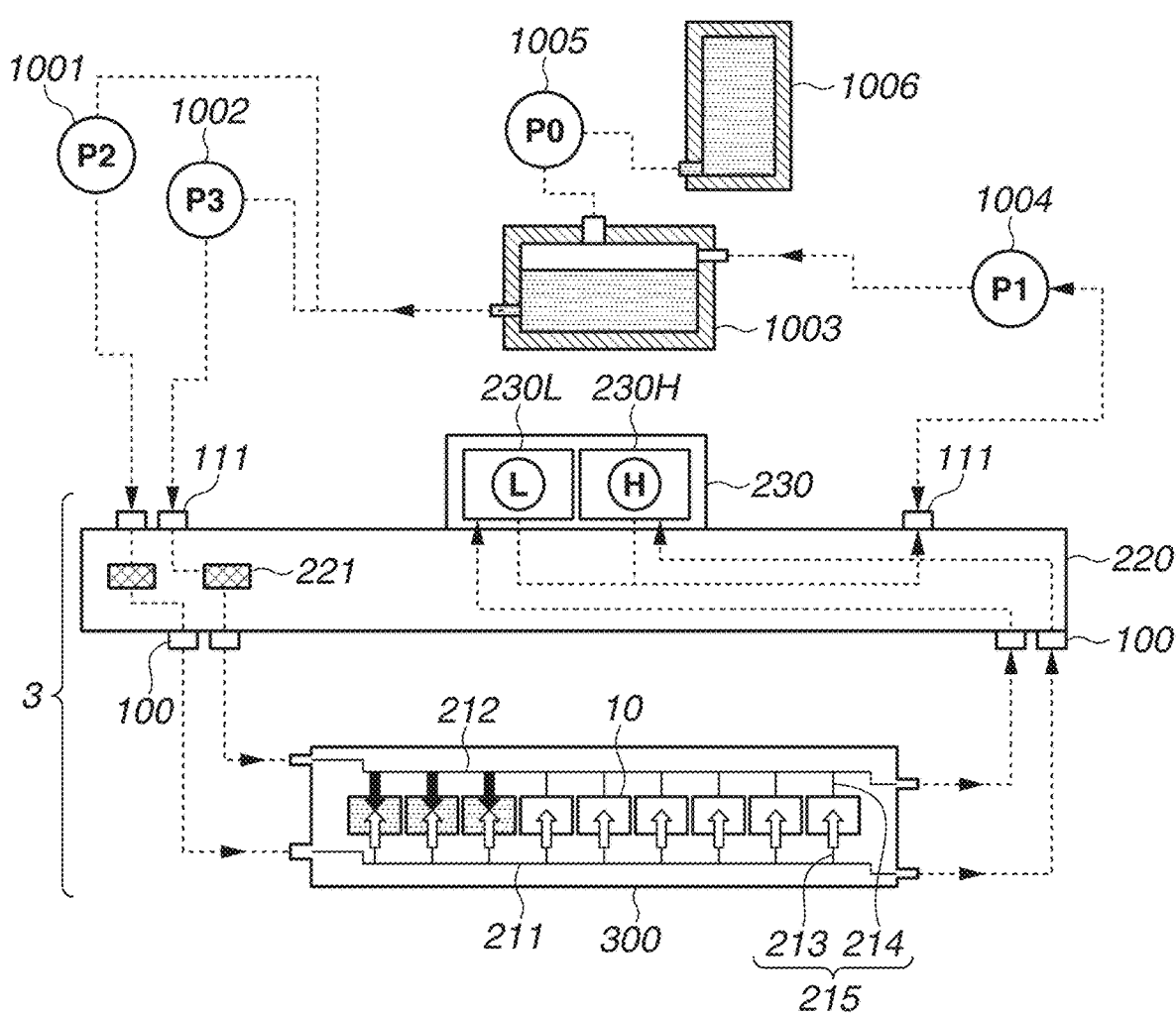
FIG. 3 is a diagram illustrating a circulation form of the liquid discharge device.

FIG. 3 is a diagram schematically illustrating the second circulation form, which is a circulation form different from the first circulation form of the circulation forms applied to the recording apparatus. A main difference from the first circulation form described above is that both of the two pressure adjustment mechanisms included in the pressure control unit 230 control the pressure on the upstream side of the pressure control unit 230 to have a fluctuation within a certain range centered on a desired setting pressure. Another difference from the first circulation form is that the second circulation pump 1004 acts as a negative pressure source that reduces the pressure on the downstream side of the pressure control unit 230. Yet another difference is that the first circulation pump (for the high pressure) 1001 and the first circulation pump (for the low pressure) 1002 are placed upstream of the liquid discharge head 3, and the pressure control unit 230 is placed downstream of the liquid discharge head 3.

In the second circulation form, the ink in the main tank 1006 is supplied to the buffer tank 1003 by the replenishing pump 1005. Then, the ink is divided into two flow channels and circulates in the two flow channels for the high pressure and for the low pressure by action of the pressure control unit 230 provided in the liquid discharge head 3. The ink divided into the two flow channels of the high pressure and of the low pressure is supplied to the liquid discharge head 3 through the liquid connection portions 111 by the action of the first circulation pump (for the high pressure) 1001 and the first circulation pump (for the low pressure) 1002. Then, the ink, which has been circulated in the liquid discharge head 3 by the action of the first circulation pump (for the high pressure) 1001 and the first circulation pump (for the low pressure) 1002, passes through the pressure control unit 230 and is discharged from the liquid discharge head 3 through the liquid connection portion 111. The discharged ink is returned to the buffer tank 1003 by the second circulation pump 1004. The first circulation pumps 1001 and 1002, the second circulation pump 1004, and the pressure control unit 230 correspond to a circulation mechanism in the second circulation form.

Even if the flow rate fluctuates due to a change in the discharge amount per unit area, the pressure control unit 230 in the second circulation form stabilizes a fluctuation in the pressure on the upstream side of the pressure control unit 230 (i.e., the liquid discharge unit 300 side) within a certain range centered on a pressure set in advance. Although the details of the pressure control unit 230 will be described below, the two pressure adjustment mechanisms included in the pressure control unit 230 can control the pressure on the upstream side of the pressure control unit 230 with a fluctuation within a certain range centered on a desired control pressure. In this circulation flow channel, the second circulation pump 1004 pressurizes the downstream side of the pressure control unit 230 through the liquid supply unit 220. This can reduce the influence of the hydraulic head pressure of the buffer tank 1003 on the liquid discharge head 3. Thus, it is possible to widen a range of choice of layout of the buffer tank 1003 in the liquid discharge device 1000. Instead of the second circulation pump 1004, for example, a hydraulic head tank placed with a predetermined hydraulic head difference from the pressure control unit 230 is also applicable. In the second circulation form, similarly to the first circulation form, the pressure control unit 230 includes two pressure adjustment mechanisms set to control pressures different from each other. Of the two negative pressure adjustment mechanisms, a negative pressure adjustment mechanism with a high pressure setting (230H in FIG. 3) and a negative pressure adjustment mechanism with a low pressure setting (230L in FIG. 3) are respectively connected to the common supply flow channel 211 and the common collection flow channel 212 in the liquid discharge unit 300 through the liquid supply unit 220. The pressure in the common supply flow channel 211 is made relatively higher than the pressure in the common collection flow channel 212 by using the two negative pressure adjustment mechanisms, whereby the flows of ink that flow from the common supply flow channel 211 to the common collection flow channel 212 through the individual flow channels 215 and the internal flow channels of the recording element substrates 10 occur.

In the second circulation form described above, an ink flow state similar to that in the first circulation form is obtained in the liquid discharge unit 300, and the second circulation form has two advantages different from the first circulation form. The first advantage is that dust and foreign substances having entered the pressure control unit 230 are prevented from flowing into the liquid discharge head 3. More specifically, in the second circulation form, the pressure control unit 230 is placed downstream of the liquid discharge head 3, and filters 221 are placed upstream of the liquid discharge head 3. Thus, when the ink is circulated in the circulation path by operation of the first circulation pumps 1001 and 1002 and the second circulation pump 1004, it is possible to remove the foreign substances having entered the pressure control unit 230 from liquid and prevent the foreign substances from flowing into the liquid discharge head 3. In the second circulation form, the pressure control unit 230 is placed downstream of the liquid discharge head 3. Thus, even if the foreign substances enter the circulation path by opening or closing of valves included in the pressure adjustment mechanisms, the foreign substances having entered the circulation path are removed by the filters 221 before reaching the liquid discharge head 3. The second advantage is that, in the second circulation form, the maximum value of the required flow rate of the liquid to be supplied from the buffer tank 1003 to the liquid discharge head 3 can be smaller than that in the first circulation form. The reason is described below.

A total of the flow rates in the common supply flow channel 211, the common collection flow channel 212, and the individual flow channels 215 in a case where the ink circulates in a recording standby state is defined as a flow rate A. The value of the flow rate A is defined as the minimum flow rate required to maintain the temperature differences in the liquid discharge unit 300 within a desired range when the temperature of the liquid discharge head 3 is adjusted in the recording standby state. A discharge flow rate in a case where the ink is discharged from all the discharge ports 13 of the liquid discharge unit 300 (all-discharge state) is defined as a flow rate F (discharge amount per discharge port×discharge frequency per unit time×number of discharge ports).

FIGS. 4A, 4B, 4C, 4D, 4E, and 4F are diagrams schematically illustrating the difference in an inflow of the ink to the liquid discharge head 3 in the first and second circulation forms. FIG. 4A illustrates the standby state in the first circulation form. FIG. 4B illustrates the all-discharge state in the first circulation form. FIGS. 4C to 4F illustrate the second circulation form. FIGS. 4C and 4D illustrate a case where the flow rate F<the flow rate A. FIGS. 4E and 4F illustrate a case where the flow rateF>the flow rate A. In each of the cases, the flow rates in the standby state and the all-discharge state are illustrated.

In the first circulation form, in which the first circulation pumps 1001 and 1002 each having a quantitative liquid delivery ability are placed downstream of the liquid discharge head 3 (FIGS. 4A and 4B), the total of the set flow rates of the first circulation pumps 1001 and 1002 is the flow rate A. With the flow rate A, it is possible to manage the temperature in the liquid discharge unit 300 in the standby state. Then, in a case where the ink is discharged from all the discharge ports 13 in the liquid discharge head 3, the total of the set flow rates of the first circulation pumps 1001 and 1002 remains to be the flow rate A, but a negative pressure caused by the discharge acts on the liquid discharge head 3. Thus, the maximum flow rate to be supplied to the liquid discharge head 3 is obtained by adding an amount consumed by the discharge from all the discharge ports 13 (flow rate F) to the flow rate A as the total of the set flow rates. Thus, the maximum value of an amount of supply to the liquid discharge head 3 is obtained by adding the flow rate F to the flow rate A, i.e., the flow rate A+the flow rate F (FIG. 4B).

A case is considered where, in the first circulation form (FIG. 2), part of the plurality of recording element substrates 10 is in the recording standby state, and the other part of the plurality of recording element substrates 10 is in the all-discharge state where the ink is discharged from all the discharge ports 13 of the other part of the plurality of recording element substrates 10. In the description below, as illustrated in FIG. 2, among the recording element substrates 10 of the liquid discharge unit 300, the recording element substrates 10 in the all-discharge state are indicated by hatched regions, and the recording element substrates 10 in the recording standby state are indicated by white regions. At this time, to the recording element substrates 10 in the all-discharge state, in addition to supply of the ink from the common supply flow channel 211 (directions of white arrows), a certain amount of ink is also supplied from the common collection flow channel 212 (directions of black arrows). To the recording element substrates 10 in the recording standby state, the ink also continues to be supplied from the common supply flow channel 211 (directions of white arrows). Since the inflow of the ink to the liquid discharge unit 300 increases, the differential pressure between the common supply flow channel 211 and the common collection flow channel 212 somewhat fluctuates. However, if cross-sectional areas of the common flow channels can be sufficiently secured, an influence of the fluctuation can be ignored.

As described above, in the first circulation form, the configuration is employed in which, while some of the recording element substrates 10 are in the recording standby state, and even if the other of the recording element substrates 10 enter the all-discharge state, the ink is also supplied to the recording element substrates 10 in the recording standby state. In such a configuration, it is possible to suitably control the amount of supply of the ink to the liquid discharge head 3. More specifically, the differential pressure between the common flow channels is controlled so that the flow rate of the ink passing through the individual flow channels 215 in the recording element substrates 10 in the recording standby state is smaller than the discharge flow rate of the ink discharged from all the discharge ports 13 of the recording element substrates 10. The differential pressure between the common supply flow channel 211 and the common collection flow channel 212 is controlled as described above, whereby it is possible to reduce the amount of ink circulated in the recording element substrates 10 in the recording standby state regardless of a fluctuation in the discharge flow rate of the ink from the discharge ports 13 of the liquid discharge head 3. If the amount of ink to be circulated in the recording element substrates 10 in the recording standby state can be reduced, exhaust heat from the liquid discharge head 3 can be reduced. Thus, it is also possible to simplify a cooling mechanism for cooling the ink in the circulation flow channel.

In the second circulation form in which the first circulation pumps 1001 and 1002 are placed upstream of the liquid discharge head 3 (FIGS. 4C to 4F), similarly to the first circulation form, the amount of supply to the liquid discharge head 3 required in the recording standby state is the flow rate A. Thus, in the second circulation form in which the first circulation pumps 1001 and 1002 are placed upstream of the liquid discharge head 3, if the flow rate A is greater than the flow rate F (FIGS. 4C and 4D), the flow rate A is sufficient as the amount of supply to the liquid discharge head 3 also in the all-discharge state. At this time, the discharge flow rate from the liquid discharge head 3 is the flow rate A−the flow rate F (FIG. 4D). However, if the flow rate F is greater than the flow rate A (FIGS. 4E and 4F), and the supply flow rate to the liquid discharge head 3 is the flow rate A in the all-discharge state, the flow rate is insufficient. Thus, if the flow rate F is greater than the flow rate A, the amount of supply to the liquid discharge head 3 needs to be the flow rate F. At this time, if the ink is discharged from all the discharge ports 13, the flow rate F is consumed by the liquid discharge head 3. This results in the state where the discharge flow rate from the liquid discharge head 3 is hardly discharged (FIG. 4F). If the flow rate F is greater than the flow rate A, and the ink is discharged but is not discharged from all the discharge ports 13, an amount of ink obtained by subtracting the ink consumed by the discharge from the flow rate F is discharged from the liquid discharge head 3.

As described above, in the second circulation form, the maximum value of the required supply flow rate, i.e., the total value of the set flow rates of the first circulation pumps 1001 and 1002, is the greater value of the flow rates A and F. Thus, as long as the liquid discharge unit 300 having the same configuration is used, the maximum value of the required supply flow rate in the second circulation form (flow rate A or F) is smaller than the maximum value of the required supply flow rate in the first circulation form (flow rate A+flow rate F). In the second circulation form, a configuration is employed in which, while some of the recording element substrates 10 are in the recording standby state, and even if the other of the recording element substrates 10 enter the all-discharge state, the ink is also supplied to the recording element substrates 10 in the recording standby state. Similarly to the first circulation form, a form is employed in which the differential pressure between the common supply flow channel 211 and the common collection flow channel 212 is controlled, whereby the amount of ink circulated in the recording element substrates 10 in the recording standby state is reduced regardless of a fluctuation in the discharge flow rate of the ink from the discharge ports 13 of the liquid discharge head 3.

In the second circulation form, the flexibility in an applicable circulation pump increases. For example, a low cost circulation pump having a simple configuration can be used, or the load of a cooler (not illustrated) installed in a path on the main body side can be reduced. Thus, the second circulation form has an advantage in that the cost of the recording apparatus can be reduced. The relatively greater the value of the flow rate A or F of a line head is, the greater the advantage becomes. The longer the longitudinal length of the line head is, the more useful the advantage becomes.

On the other hand, the first circulation form has an advantage over the second circulation form in some respects. More specifically, in the second circulation form, the flow rate flowing in the liquid discharge unit 300 is greatest in the recording standby state. Thus, the smaller the discharge amount per unit area is for an image (hereinafter referred to as a low-duty image), the higher the negative pressure applied to each discharge port becomes. Thus, if the width of the flow channel is narrow and the flow channel has a high negative pressure, the high negative pressure is applied to each of the discharge ports for the low-duty image in which unevenness is easily noticed. Thus, many so-called satellite droplets that are discharged with a main droplet of ink may be caused, and recording quality may be degraded.

On the other hand, in the first circulation form, a high negative pressure is applied to each of the discharge ports when an image for which the discharge amount per unit area is great (hereinafter referred to as a high-duty image) is formed. Thus, the first circulation form has an advantage that even if the satellite droplets are caused, the satellite droplets are unlikely to be noticed, and an influence of the satellite droplets on the image is small. A desirable selection can be made between the two circulation forms in view of the specifications of the liquid discharge head and the main body of the recording apparatus (e.g., discharge flow rate F, minimum circulation flow rate A, and channel resistance in the head).

(Structure of Liquid Discharge Head)

Figure 5A:
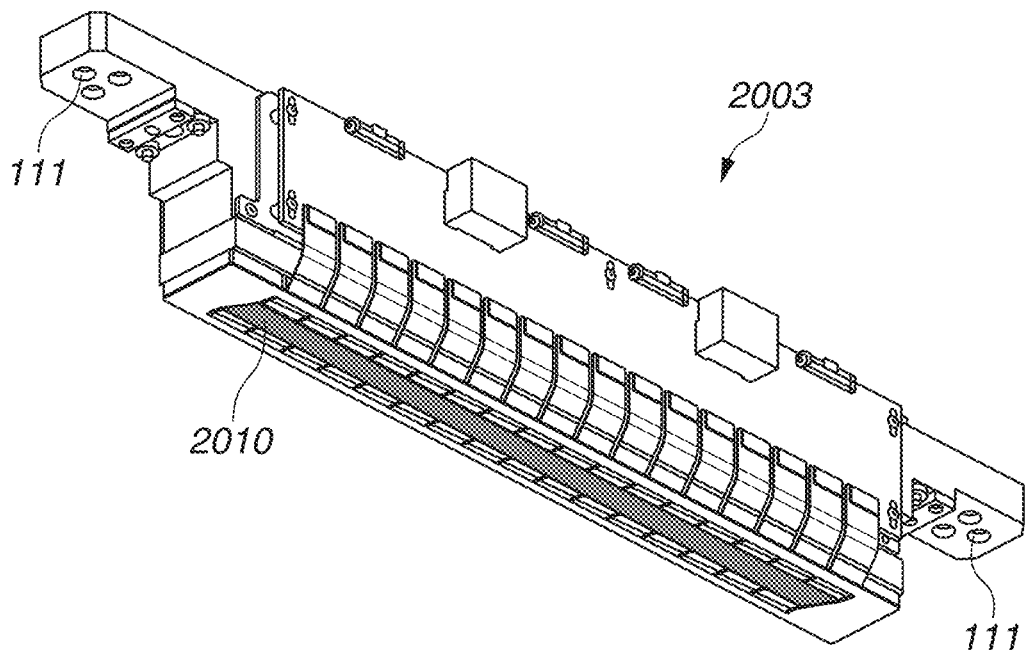
FIGS. 5A and 5B are diagrams illustrating a liquid discharge head.
Figure 5B:
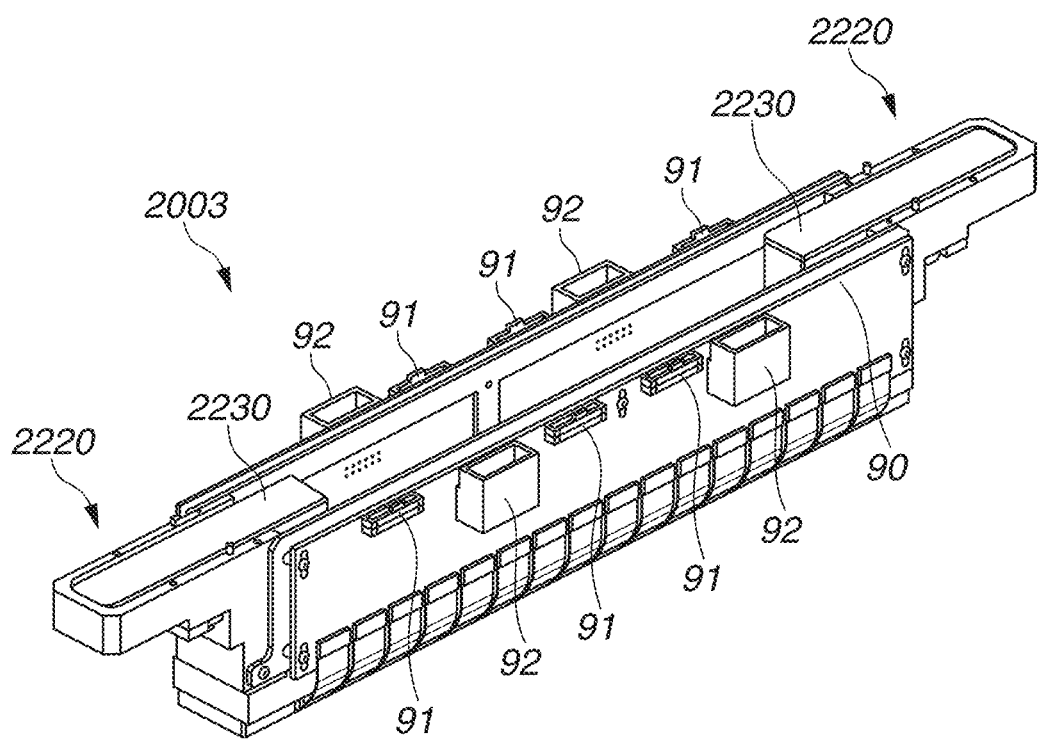

FIGS. 5A and 5B are perspective views each illustrating a liquid discharge head 2003. The structure of the liquid discharge head 2003 is described. The liquid discharge head 2003 is an inkjet line recording head including 16 recording element substrates 2010 linearly arranged in a longitudinal direction of the liquid discharge head 2003 and capable of performing recording using liquid of one color. The liquid discharge head 2003 includes liquid connection portions 111, signal input terminals 91, and power supply terminals 92. The signal input terminals 91 and the power supply terminals 92 are placed on both sides of the liquid discharge head 2003. This is to reduce a voltage drop or a signal transmission delay that occurs in a wiring portion in each of the recording element substrates 2010.

Figure 6:
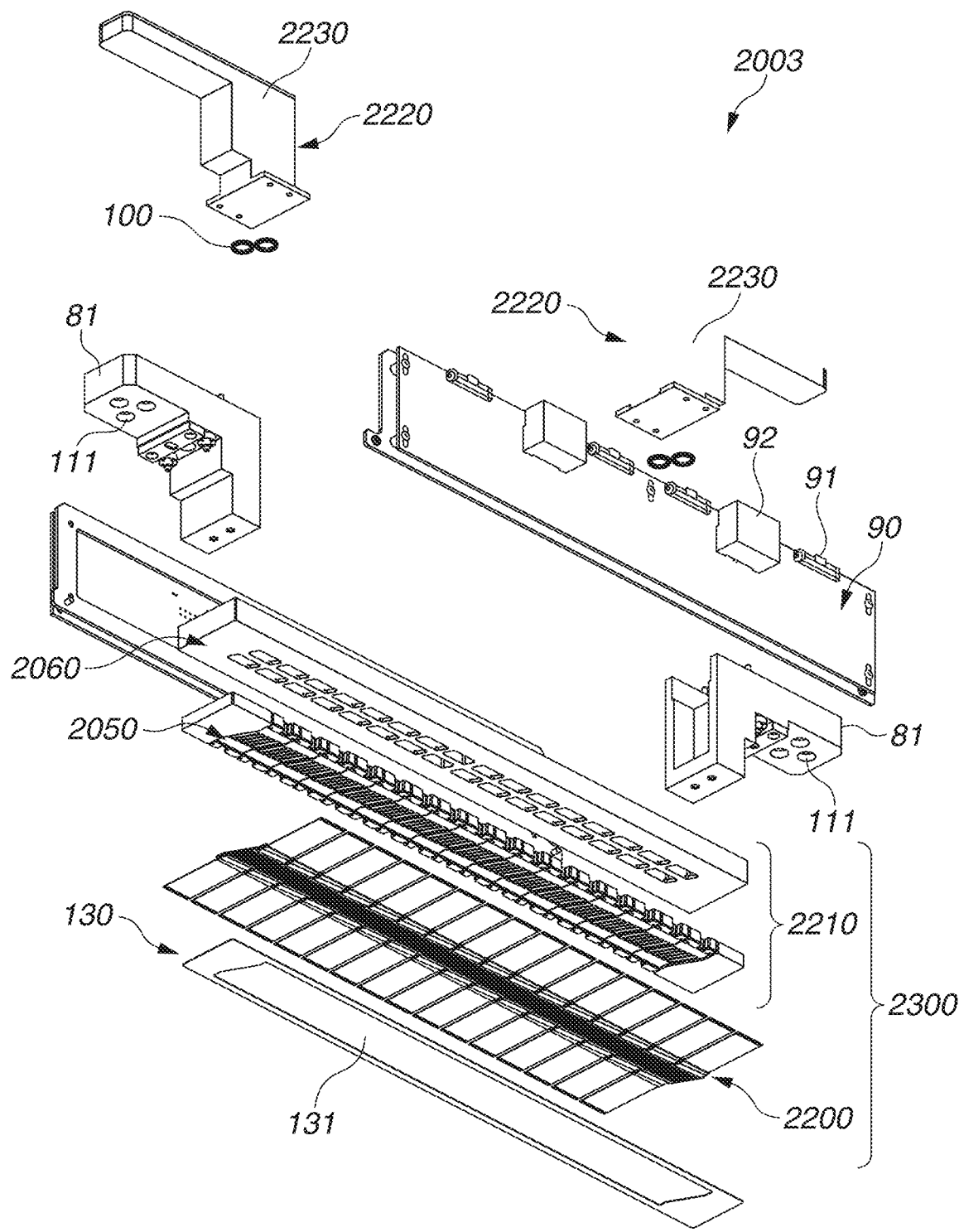
FIG. 6 is a diagram illustrating the liquid discharge head.

FIG. 6 is an exploded perspective view illustrating the liquid discharge head 2003, and illustrates components or units included in the liquid discharge head 2003 by separating the components or the units by the function. The liquid discharge head 2003 ensures the stiffness of the liquid discharge head 2003 by a second flow channel member 2060 included in a liquid discharge unit 2300. Liquid discharge unit supporting portions 81 are connected to both end portions of the second flow channel member 2060. The liquid discharge unit 2300 is mechanically coupled to a carriage of the liquid discharge device 2000, thereby positioning the liquid discharge head 2003. Liquid supply units 2220, each including a pressure control unit 2230, and an electric wiring substrate 90 are coupled to the liquid discharge unit supporting portions 81. A filter (not illustrated) is built into each of the two liquid supply units 2220.

The two pressure control units 2230 are each set to control a relatively high or low pressure different from each other. As in FIGS. 5A and 5B, if the pressure control units 2230 for the high pressure and for the low pressure are respectively installed in one end portion and the other end portion of the liquid discharge head 2003, the flows of liquid in the common supply flow channel and the common collection flow channel, which are extending in the longitudinal direction of the liquid discharge head 2003, are opposite to each other. In such a configuration, heat exchange is accelerated between the common supply flow channel and the common collection flow channel, thereby reducing a temperature difference between the two common flow channels. This has an advantage in that the temperature difference between the plurality of recording element substrates 2010 provided along the common flow channels is reduced, and print unevenness due to the temperature difference is unlikely to occur.

Next, details of a flow channel member 2210 of the liquid discharge unit 2300 are described. As illustrated in FIG. 6, the flow channel member 2210 includes a first flow channel member 2050 and a second flow channel member 2060, which are stacked together, and distributes liquid supplied from the liquid supply units 2220 to discharge modules 2200. The flow channel member 2210 also functions as a flow channel member for returning liquid circulated from the discharge modules 2200 to the liquid supply units 2220. The second flow channel member 2060 of the flow channel member 2210 is a flow channel member in which the common supply flow channel and the common collection flow channel are formed, and also has a function of mainly providing the stiffness of the liquid discharge head 2003. Thus, it is desirable that a material of the second flow channel member 2060 have sufficient corrosion resistance to liquid and high mechanical strength. More specifically, it is desirable to use stainless steel, titanium, or alumina.

Figure 7A:
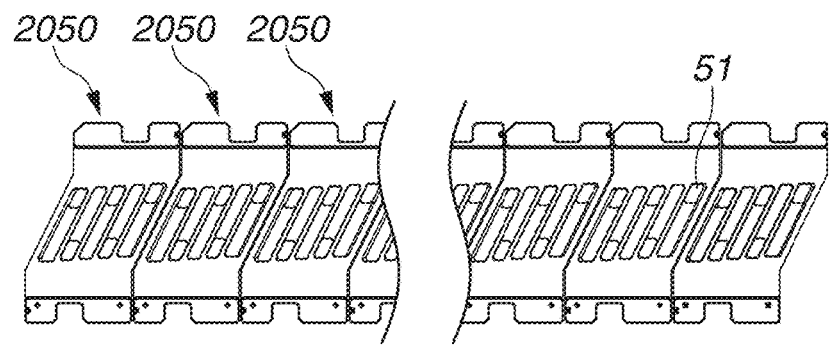
FIGS. 7A, 7B, 7C, 7D, and 7E are diagrams illustrating flow channel members of a liquid discharge unit.
Figure 7B:
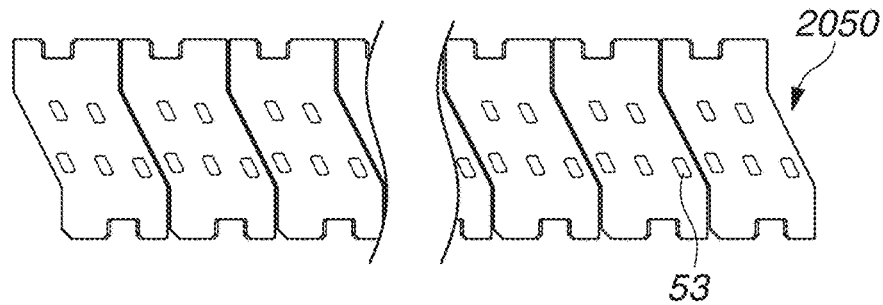
Figure 7C:
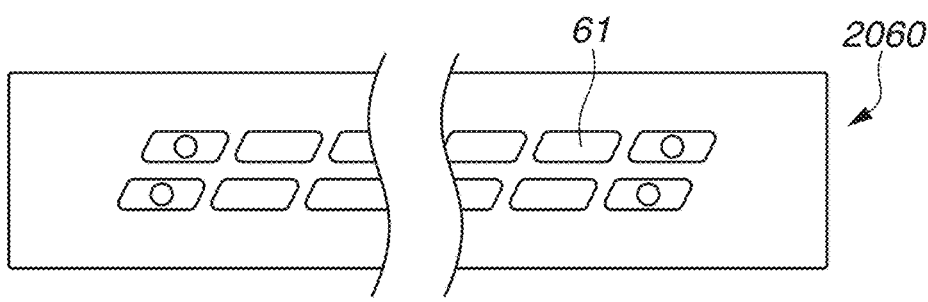
Figure 7D:
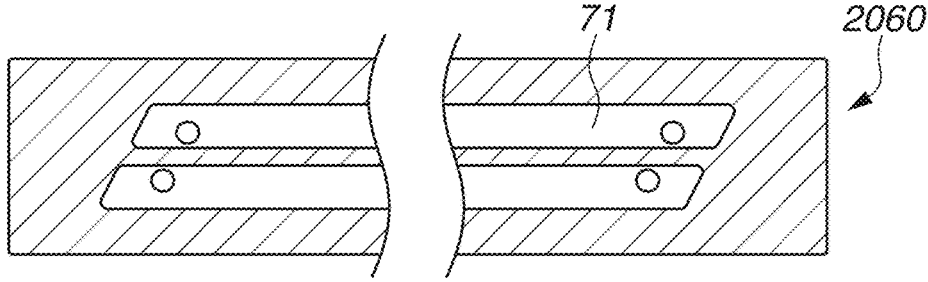
Figure 7E:
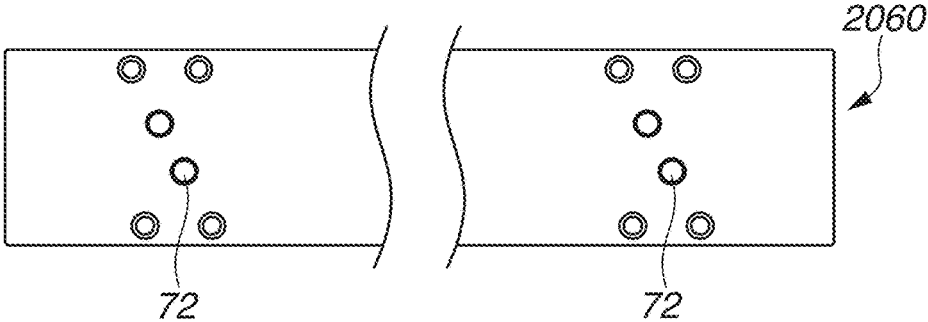

FIG. 7A is a diagram illustrating a surface of the first flow channel member 2050 on which the discharge module 2200 is mounted. FIG. 7B is a diagram illustrating a back side of the surface illustrated in FIG. 7A, and illustrating the surface that comes into contact with the second flow channel member 2060. The first flow channel member 2050 includes a plurality of members corresponding to the discharge modules 2200 arranged to be adjacent to each other. Thus, the divided structure is employed, whereby it is possible to deal with a length of the liquid discharge head 2003 by arranging a plurality of modules. Accordingly, it is possible to particularly suitably apply the first flow channel member 2050 to a relatively long liquid discharge head corresponding to, for example, a length of B2 size or larger. As illustrated in FIG. 7A, a communicating port 51 of the first flow channel member 2050 hydraulically communicate with the discharge modules 2200. As illustrated in FIG. 7B, an individual communicating port 53 of the first flow channel member 2050 hydraulically communicate with a communicating port 61 of the second flow channel member 2060. FIG. 7C is a diagram illustrating a surface of the second flow channel member 2060 that comes into contact with the first flow channel member 2050. FIG. 7D is a diagram illustrating a cross section of a center portion in a thickness direction of the second flow channel member 2060. FIG. 7E is a diagram illustrating a surface of the second flow channel member 2060 that comes into contact with the liquid supply units 2220. One of common flow channel grooves 71 of the second flow channel member 2060 is a common supply flow channel 2211 illustrated in FIG. 8, and the other is a common collection flow channel 2212. Each of the common flow channel grooves 71 is provided along the longitudinal direction of the liquid discharge head 2003, and liquid is supplied from one end side to the other end side of the common flow channel grooves 71. Directions of the flows of liquid in the common supply flow channel 2211 and the common collection flow channel 2212 are opposite to each other.

Figure 8:
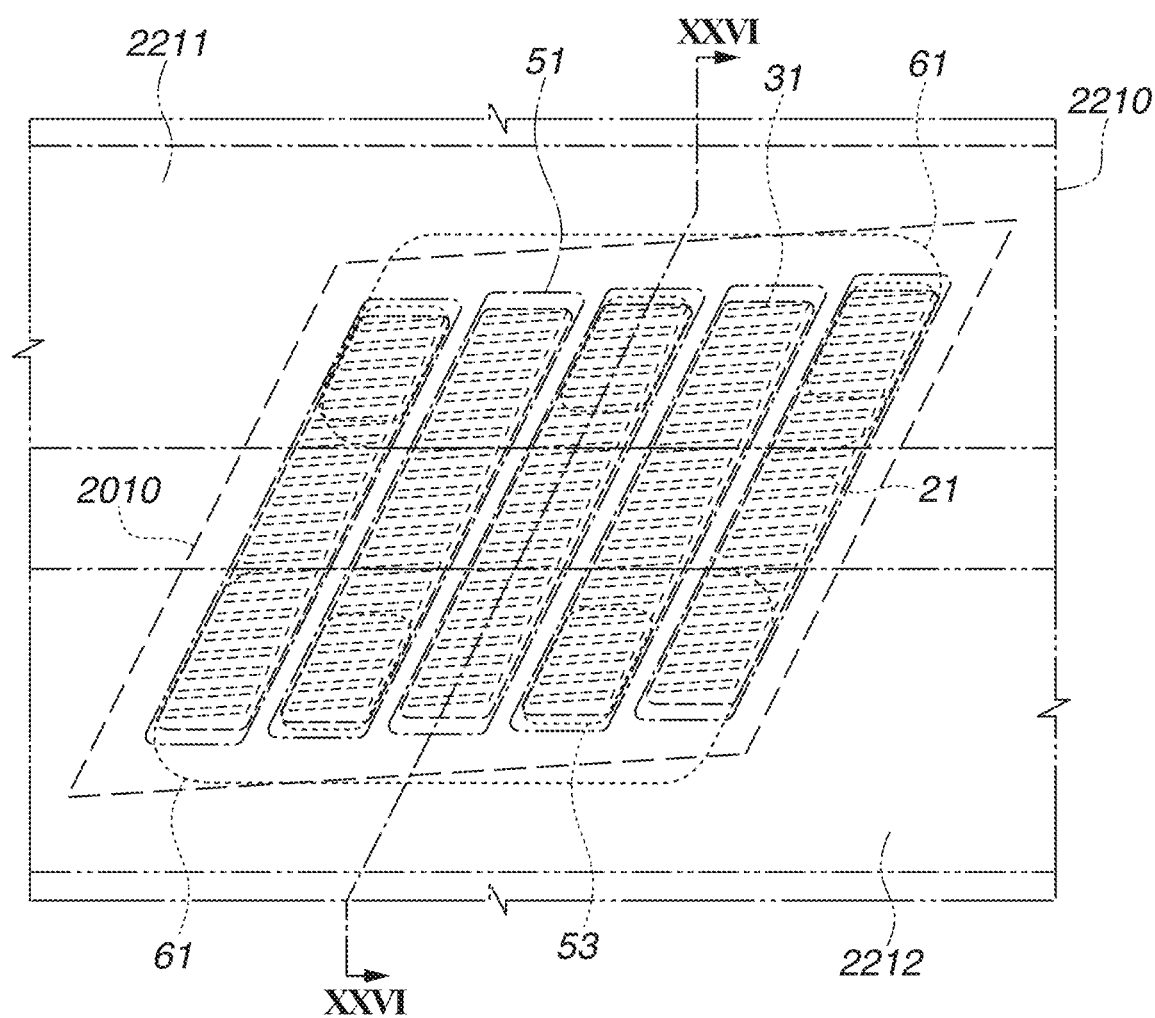
FIG. 8 is a diagram illustrating a liquid connection relationship between a recording element substrate and a flow channel member.

FIG. 8 is a perspective view illustrating a liquid connection relationship between the recording element substrate 2010 and the flow channel member 2210. With reference to FIGS. 7A, 7B, 7C, 7D, 7E, and 8, a description is given. In the flow channel member 2210, a set of the common supply flow channel 2211 and the common collection flow channel 2212 extending in the longitudinal direction of the liquid discharge head 2003 is provided. The communicating port 61 of the second flow channel member 2060 is aligned with individual communicating port 53 of each of the first flow channel members 2050 and is connected thereto, and the communicating port 61 and the individual communicating port 53 form a liquid supply path that communicates from a communicating port 72 of the second flow channel member 2060 to the communicating port 51 of the first flow channel member 2050 through the common supply flow channel 2211. Similarly, a liquid supply path that communicates from the communicating port 72 of the second flow channel member 2060 to the communicating port 51 of the first flow channel member 2050 through the common collection flow channel 2212 is also formed.

Figure 9:
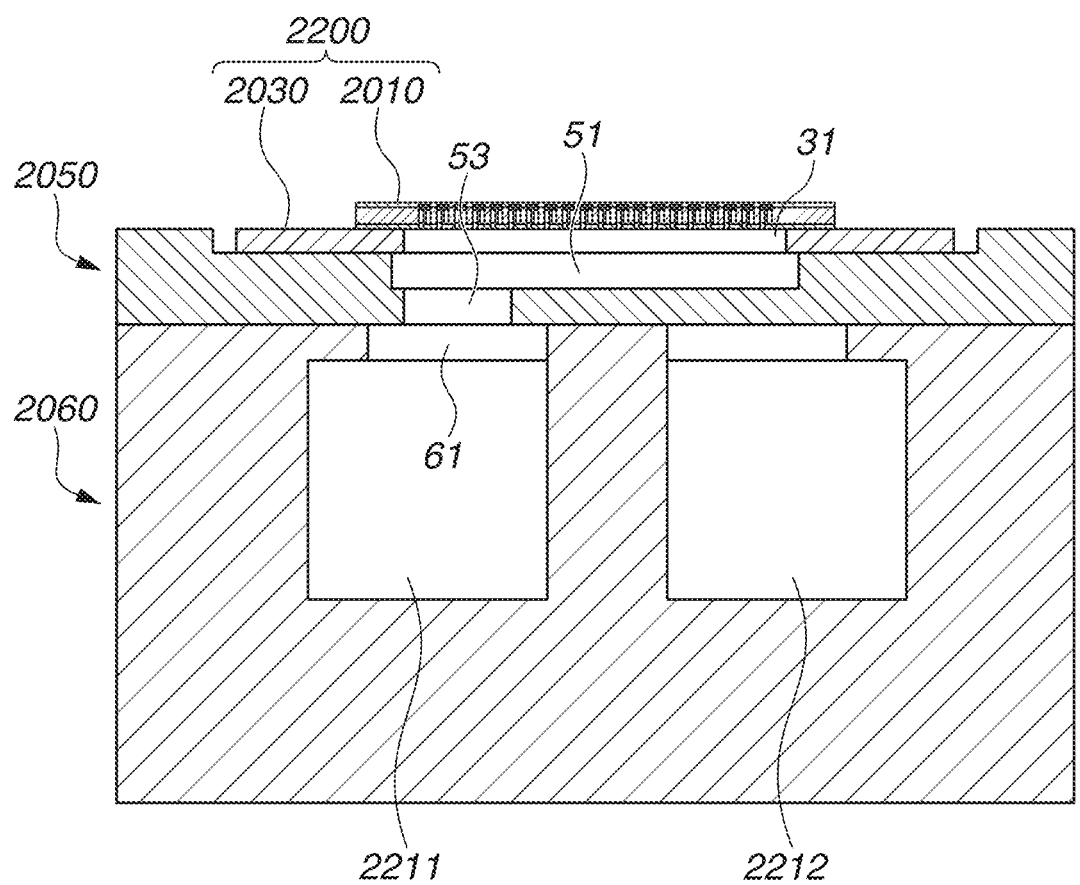
FIG. 9 is a diagram illustrating the liquid connection relationship between the recording element substrate and the flow channel member.

FIG. 9 is a diagram illustrating a cross section cut along an XXVI-XXVI line in FIG. 8. The common supply flow channel 2211 is connected to one of the discharge modules 2200 through the communicating port 61, the individual communicating port 53, and the communicating port 51. While not illustrated in FIG. 9, as it is evident from FIG. 8, in another cross section, the common collection flow channel 2212 is connected to the discharge module 2200 in a similar path. In each of the discharge modules 2200 and each of the recording element substrates 2010, a flow channel that communicate with a discharge port is formed. Part or all of the supplied liquid can circulate through a discharge port that is not performing a discharge operation. The common supply flow channel 2211 is connected to the pressure control unit 2230 (for the high pressure), and the common collection flow channel 2212 is connected to the pressure control unit 2230 (for the low pressure), through the liquid supply units 2220. Thus, due to the differential pressure between the common supply flow channel 2211 and the common collection flow channel 2212, flows that flow from the common supply flow channel 2211 to the common collection flow channel 2212 through the discharge ports of the recording element substrates 2010 occur.

<Discharge Module>

Figure 10A:
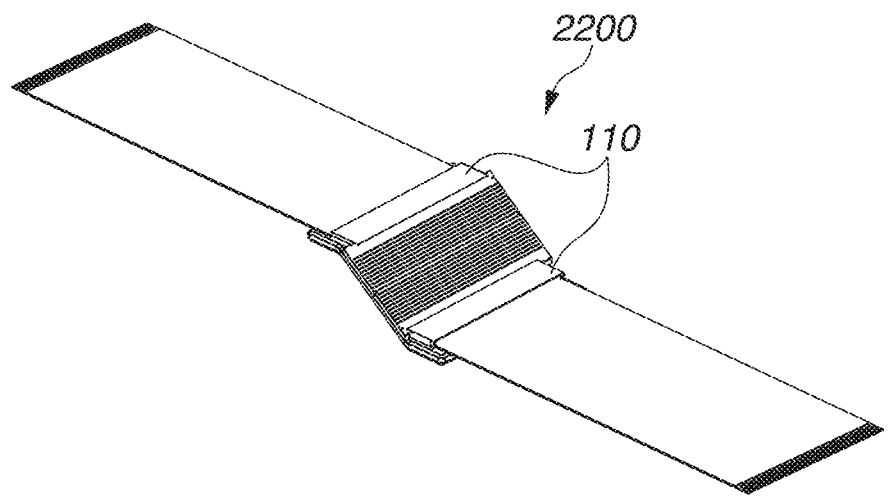
FIGS. 10A and 10B are diagrams illustrating a discharge module.
Figure 10B:
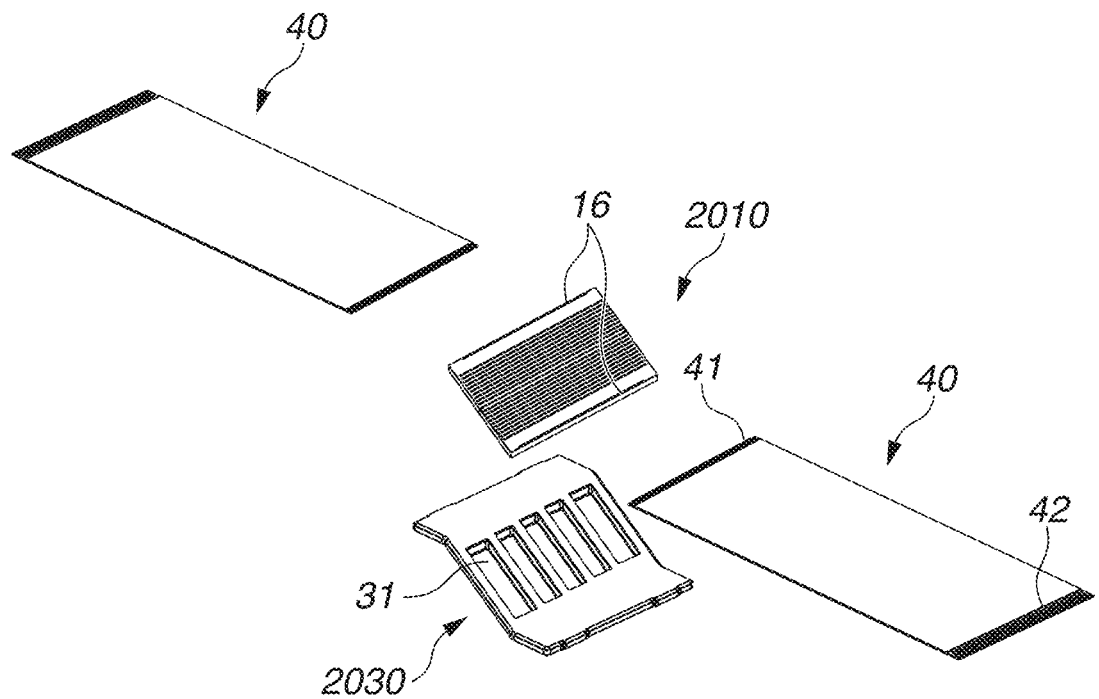

FIG. 10A is a perspective view illustrating one of the discharge modules 2200. FIG. 10B is an exploded view of the discharge module 2200. A plurality of terminals 16 is placed in each side portion along a direction of a plurality of discharge port arrays of the recording element substrate 2010 (i.e., long side portions of the recording element substrate 2010). Accordingly, two flexible wiring substrates 40 to be electrically connected to the recording element substrate 2010 are placed for one recording element substrate 2010. This is, because there are 20 discharge port arrays on the recording element substrate 2010, to reduce a voltage drop or a signal delay that occurs in the wiring portion in the recording element substrate 2010 by shortening the maximum distances from the terminals 16 to recording elements. A liquid communicating port 31 of a supporting member 2030 is provided below the recording element substrate 2010 and is open across all the discharge port arrays.

<Structure of Recording Element Substrate>

Figure 11A:
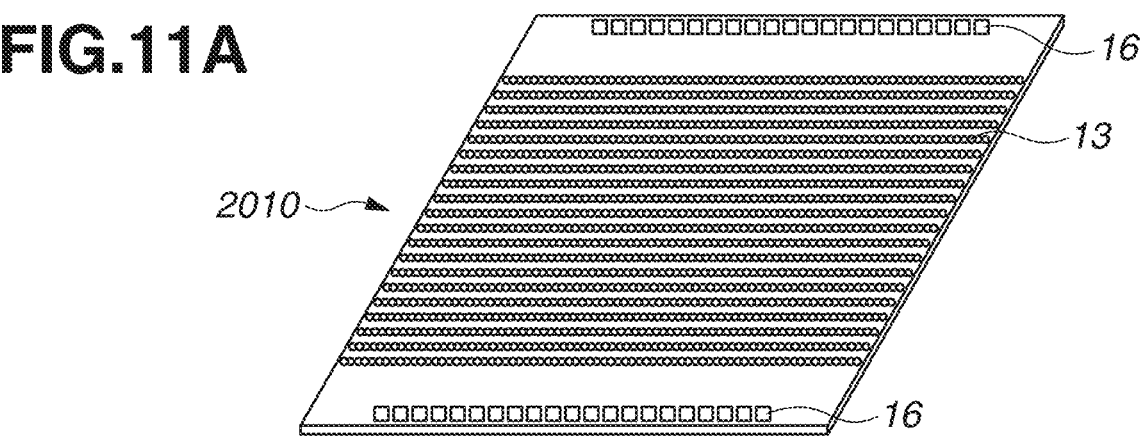
FIGS. 11A, 11B, and 11C are diagrams illustrating a recording element substrate.
Figure 11B:
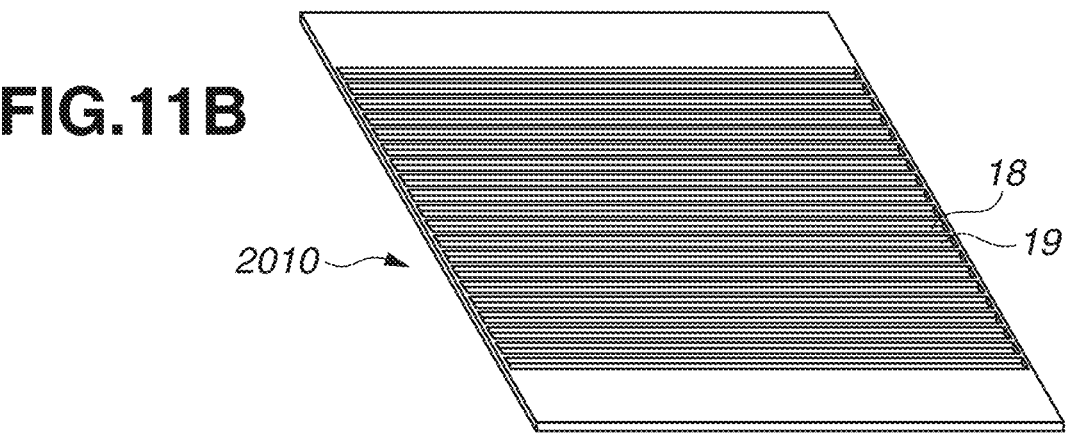
Figure 11C:
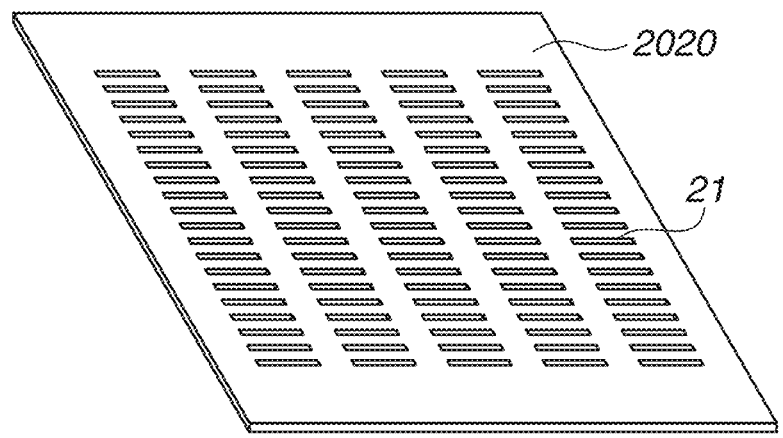

FIG. 11A is a diagram schematically illustrating a surface of the recording element substrate 2010 on which discharge ports 13 are disposed. FIG. 11C is a diagram schematically illustrating a back surface of the surface in FIG. 11A. Below the discharge ports 13 of the recording element substrate 2010, an energy generation element is provided. The energy generation element gives energy to the ink (liquid), thereby discharging the ink and performing recording. FIG. 11B is a diagram schematically illustrating the back surface of the recording element substrate 2010 in a case where a cover plate 2020 provided on the back surface of the recording element substrate 2010 in FIG. 11C is removed. As illustrated in FIG. 11B, on the back surface of the recording element substrate 2010, a liquid supply path 18 and a liquid collection path 19 are alternately provided along the direction of the discharge port arrays. The terminals 16 are placed in each of the side portions along the direction of the discharge port arrays of the recording element substrate 2010. A set of the liquid supply path 18 and the liquid collection path 19 is provided for each of the discharge port arrays. In the cover plate 2020, an opening 21 that communicates with the liquid communicating port 31 of the supporting member 2030 is provided.

<Pressure Control Unit>

Figure 12:
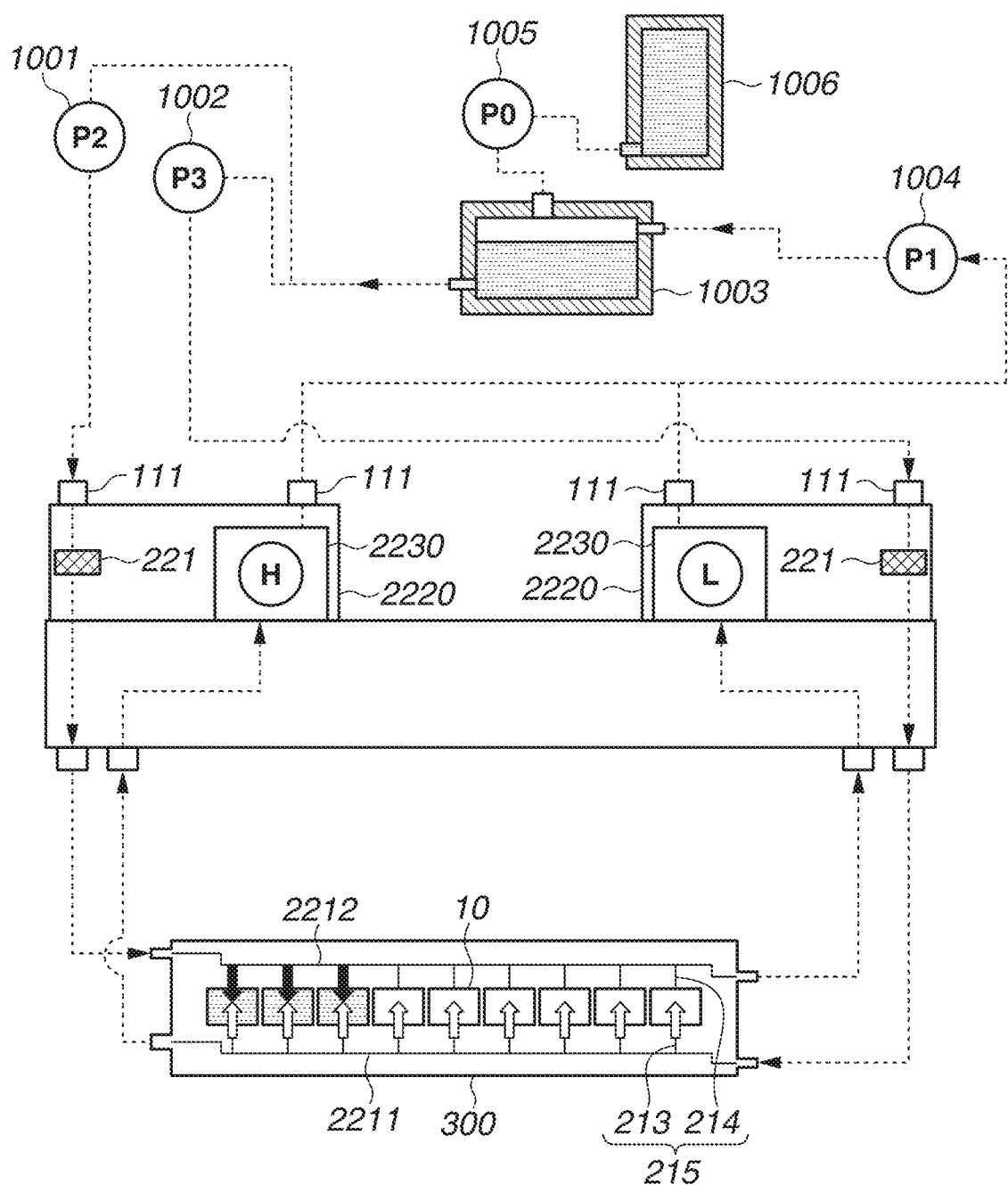
FIG. 12 is a diagram illustrating a circulation form of a liquid discharge device.

The pressure control unit according to the exemplary embodiment of the present disclosure is described. First, as a circulation form in which the pressure control unit is placed, a circulation form illustrated in FIG. 12 is described. The circulation form illustrated in FIG. 12 is obtained by slightly changing placement of the pressure control unit from that in the second circulation form. However, the circulation form is basically similar to that described as the second circulation form. In one end portion and the other end portion of the liquid discharge head 2003, the pressure control units 2230 for the high pressure (H) and for the low pressure (L) are respectively installed. The liquid passes through the common supply flow channel 2211 or the common collection flow channel 2212, flows into either of the pressure control units 2230, and is guided to the second circulation pump 1004 through the liquid connection portion 111.

Figure 13A:
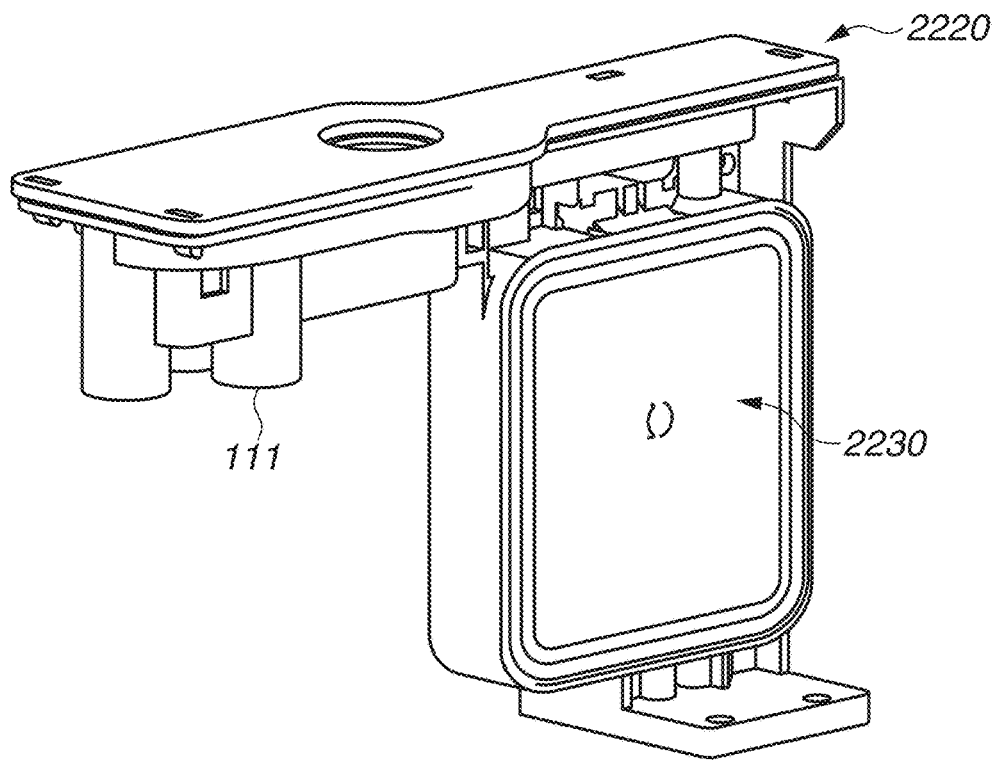
FIGS. 13A and 13B are diagrams illustrating a pressure control unit.
Figure 13B:
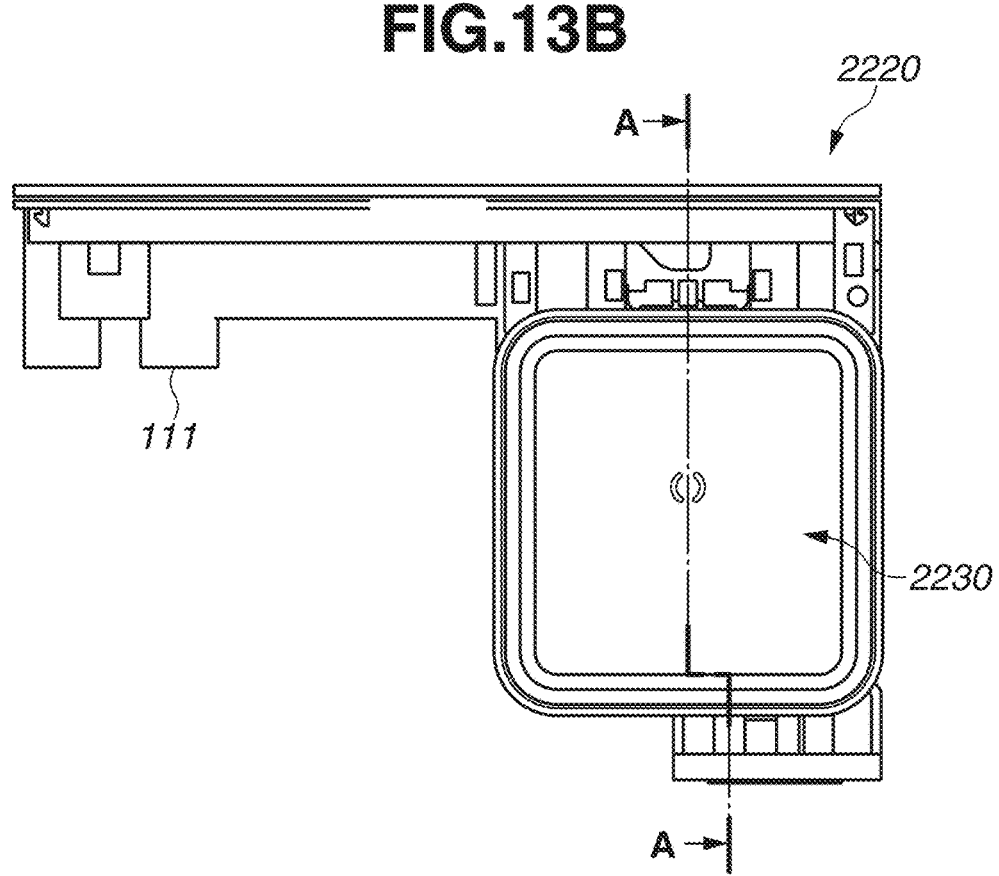

FIGS. 13A, 13B, 14A, and 14B are enlarged views of the pressure control unit 2230. FIG. 13A is a perspective view of an external appearance of the pressure control unit 2230. FIG. 13B is a front view of the pressure control unit 2230. FIGS. 14A and 14B are cross-sectional views of the pressure control unit 2230. In the pressure control unit 2230 illustrated in FIGS. 13A, 13B, 14A, and 14B, a flexible film 405 is placed to cover an open surface of a housing. In such a configuration, there is formed a first liquid storage chamber 401 that can store the liquid inside and of which an inner volume is variable. In other words, at least part of an outer wall of the first liquid storage chamber 401 is formed of the flexible film 405. A pressing plate 404 is fixed to an inner surface side (first liquid storage chamber side) of the flexible film 405, and presses the flexible film 405 in a direction of expanding the first liquid storage chamber 401. Between the pressing plate 404 and the housing, a negative pressure spring 411 as an urging member is provided. The negative pressure spring 411 urges the pressing plate 404 in a direction of increasing the inner volume of the first liquid storage chamber 401. In other words, the negative pressure spring 411 urges the pressing plate 404, and the urged pressing plate 404 presses the flexible film 405 in the direction of expanding the first liquid storage chamber 401.

Below the first liquid storage chamber 401 in the vertical direction, there is formed an inflow port 414 that causes the liquid to flow into the first liquid storage chamber 401. The inflow port 414 is configured to communicate with the common supply flow channel 2211 or the common collection flow channel 2212. Thus, the liquid having passed through the common supply flow channel 2211 or the common collection flow channel 2212 flows into the first liquid storage chamber 401 through the inflow port 414. The vertical direction according to the exemplary embodiments of the present disclosure is the vertical direction when the pressure control unit 2230 is used (i.e., when pressure control is performed by attaching the pressure control unit to the liquid discharge device).

Above the first liquid storage chamber 401 in the vertical direction, there is placed a valve chamber 402 that communicates with the first liquid storage chamber 401 and constitutes part of the first liquid storage chamber 401. In the valve chamber 402, there is formed (opened) an outflow port 410 that causes the liquid stored in the first liquid storage chamber 401 to flow out to the outside. At an end of the outflow port 410 of the valve chamber 402, a second liquid storage chamber 403 different from the first liquid storage chamber 401 is formed. More specifically, between the first liquid storage chamber 401 and the second liquid storage chamber 403, the outflow port 410 is formed. The second liquid storage chamber 403 is connected to the second circulation pump 1004 through a liquid connection portion (liquid connection portion 111 in FIGS. 13A and 13B). Thus, the liquid having passed through the outflow port 410 and flowed out is guided to the second circulation pump 1004 through the second liquid storage chamber 403 and the liquid connection portion. The first liquid storage chamber 401 is provided on an upstream side in the flow of liquid, which is a side where the liquid discharge head of the pressure control unit 2230 is connected. The second liquid storage chamber 403 is provided on a downstream side in the flow of liquid of the first liquid storage chamber 401. More specifically, the liquid having flowed from the common supply flow channel 2211 or the common collection flow channel 2212 to the first liquid storage chamber 401 through the inflow port 414 flows into the valve chamber 402 in the first liquid storage chamber 401 and further flows into the second liquid storage chamber 403 through the outflow port 410. Then, the liquid is guided to the second circulation pump 1004 through the liquid connection portion.

As illustrated in FIGS. 14A and 14B, it is desirable to form the outflow port 410 above the part of the outer wall of the first liquid storage chamber 401 formed of the flexible film 405, in the vertical direction. By forming the valve chamber 402 and the outflow port 410, which are downstream in the flow of liquid of the first liquid storage chamber 401, above in the vertical direction, it is easy to discharge air in the first liquid storage chamber 401 when filling the first liquid storage chamber 401 with the liquid. If the air is sufficiently discharged when filling the first liquid storage chamber 401 with the liquid, for example, it is possible to prevent the hydraulic head pressure in the first liquid storage chamber 401 from changing due to a change in an amount of air while the pressure control unit 2230 is used. Further, it is possible to prevent a pump pressure from changing due to the air discharged from the inside of the first liquid storage chamber 401 flowing into the second circulation pump 1004 while the pressure control unit 2230 is used. In a case where the air flows into the first liquid storage chamber 401 while the pressure control unit 2230 is used, the air is unlikely to be accumulated in the part of the first liquid storage chamber 401 formed of the flexible film 405, and is likely to be accumulated in the valve chamber 402 or discharged from the outflow port 410. Generally, a thin member such as the flexible film 405 has a high gas penetration. Thus, if the air remains in the part formed of the flexible film 405, a volume of remaining air is likely to increase due to the gas penetration. If the volume of remaining air increases, the hydraulic head pressure in the first liquid storage chamber 401 may change or the air may flow into the second circulation pump 1004, whereby the pump pressure may change. Thus, it is desirable to make the remaining air unlikely to be accumulated near the side wall formed of the flexible film 405.

Next, a valve 406 placed in the valve chamber 402 is described. FIGS. 15A and 15B illustrate enlarged views of the valve 406. FIGS. 15A and 15B are diagrams of the valve 406 viewed from different angles. The valve 406 illustrated in FIGS. 15A and 15B has a lever shape and is capable of pivoting about a shaft 408 fitted to a bearing (not illustrated) included in the pressure control unit 2230. In one end portion of the valve 406, a valve portion 407 is provided. A variable gap 413 (FIG. 14B) is formed between the valve portion 407 and the outflow port 410, thereby giving a variable flow resistance to the liquid flowing from the valve chamber 402 to the second liquid storage chamber 403. A size of the gap 413 represents a valve opening degree. If the gap 413 is large, the valve opening degree is high. In the valve chamber 402, a valve spring 412 is placed. The valve spring 412 urges the valve portion 407 in a direction of reducing the gap 413 between the valve portion 407 and the outflow port 410.

In the other end portion of the valve 406, which is located on an opposite side of the valve portion 407 across the shaft 408, there is formed a pressing plate contact portion 409 that transmits motion of the flexible film 405 and the pressing plate 404 in the first liquid storage chamber 401 to the valve 406. When the flexible film 405 and the pressing plate 404 move (are displaced) corresponding to the inner volume of the first liquid storage chamber 401, part of the pressing plate 404 and the pressing plate contact portion 409 come into contact with each other, whereby the valve 406 moves to pivot in conjunction with the motion of the pressing plate 404. FIG. 14B illustrates a state where the valve 406 pivots in a direction in which the gap 413 between the valve portion 407 of the valve 406 and the outflow port 410 becomes large, i.e., the direction in which the valve opening degree of the outflow port 410 becomes high. If the pressing plate 404 moves in the direction of increasing the inner volume of the first liquid storage chamber 401, the pressing plate contact portion 409 of the valve 406 in contact with the pressing plate 404 moves to pivot about the shaft 408 of the valve 406. This motion increases the gap 413 between the valve portion 407 and the outflow port 410, and the valve opening degree of the outflow port 410 becomes high. Conversely, if the pressing plate 404 moves in the direction of decreasing the inner volume of the first liquid storage chamber 401, the pressing plate contact portion 409 of the valve 406 in contact with the pressing plate 404 moves to pivot about the shaft 408 of the valve 406. This motion reduces the gap 413 between the valve portion 407 and the outflow port 410, and the valve opening degree of the outflow port 410 becomes low. Thus, the flexible film 405 and the pressing plate 404 move, whereby the valve 406 moves, and the gap 413 between the valve portion 407 and the outflow port 410, i.e., the valve opening degree of the outflow port 410, changes.

As described above, the valve opening degree of the outflow port 410 changes depending on the motion (pivoting movement) of the valve 406. The valve 406 is moved by the pressing plate 404 coming into contact with in the pressing plate contact portion 409. However, a range of the motion (range of movement) of the valve 406 is limited by the shaft 408 and the bearing fitted to the shaft 408, which are members other than the pressing plate 404. Thus, the valve 406 makes the pivoting movement that is a motion limited by the shaft 408 and the bearing. More specifically, if the pressing plate 404 presses the flexible film 405 and moves in the direction of expanding a liquid storage chamber (first liquid storage chamber 401), the valve 406 comes into contact with the pressing plate 404 in the pressing plate contact portion 409 and moves in conjunction with the motion of the pressing plate 404. The valve opening degree of the outflow port 410 becomes high due to this motion. However, the range of the motion when the valve opening degree of the outflow port 410 is high is limited to a range set in advance. Thus, even under an influence of the flexible film 405 or the pressing plate 404, the gap 413 between the valve portion 407 and the outflow port 410, which is the valve opening degree of the outflow port 410, can have a desired value.

On the other hand, a case is considered where a liquid storage chamber (pressure chamber) is formed of the flexible film 405 and the pressing plate 404, a valve is formed integrally with the flexible film 405 and the pressing plate 404, and the range of movement of the valve is not limited by a member other than the pressing plate 404. In this case, the motion of the valve is likely to be influenced by the stiffness of the flexible film 405 or by a crease or wrinkle of the flexible film 405. For example, there is a case where the pressing plate 404 moves in an inclined state due to the influence of wrinkle of the flexible film 405, and the valve opening degree of the outflow port 410 does not have a desired value. However, in the exemplary embodiment of the present disclosure, the range of movement of the valve 406 is limited by the members other than the pressing plate 404. Thus, the valve opening degree of the outflow port 410 can have a predetermined value regardless of states of the flexible film 405 and the pressing plate 404. Thus, the flexible film 405 is unlikely to influence control of the pressure of liquid using the valve 406, and it is possible to perform stable pressure control.

Figure 16A:
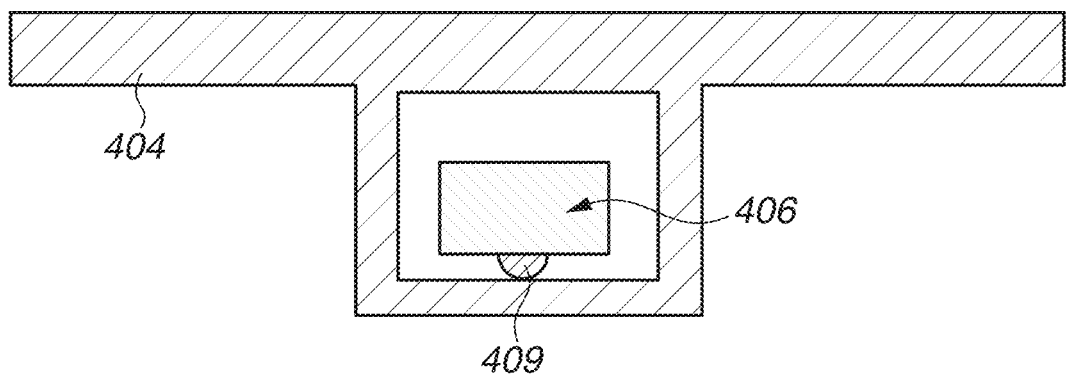
FIGS. 16A and 16B are diagrams illustrating an inclination of a pressing plate.
Figure 16B:
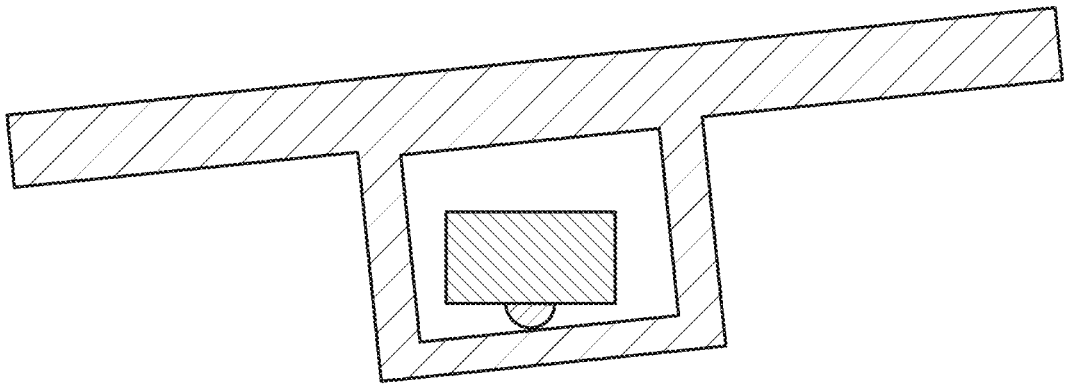

As illustrated in FIGS. 15A and 15B, it is desirable that a shape of the pressing plate contact portion 409 of the valve 406 be at least part of a spherical shape. FIGS. 15A and 15B illustrate the pressing plate contact portion 409 having a hemispherical shape. FIGS. 16A and 16B are diagrams each illustrating a state of inclination of the pressing plate 404. FIG. 16B illustrates the state where the pressing plate 404 has moved to incline from the state in FIG. 16A. The shape of the pressing plate contact portion 409 is at least part of a spherical shape, whereby, even if the pressing plate 404 is displaced in an inclined state as in FIG. 16B, the pressing plate 404 comes into contact with the pressing plate contact portion 409 having the spherical shape. Thus, a load point of the valve 406 is constant, and the valve 406 can make a stable movement, which is desirable.

Next, the pressure in the first liquid storage chamber 401 of the pressure control unit is described. The pressure in the first liquid storage chamber 401 is determined by the following relational expressions (1) and (2).

$$(F1+P1S1)L1=(F2-(P2-P1)S2)L2 \tag{1}$$

$$(P1-P2)=RQ \tag{2}$$

In these expressions, values indicated by parameters are as follows.

P1: pressure in the first liquid storage chamber 401 (gauge pressure)
P2: pressure in the second liquid storage chamber 403 (gauge pressure)
F1: force of the negative pressure spring 411
F2: force of the valve spring 412
S1: pressure reception area of the pressing plate 404
S2: pressure reception area of the valve portion 407

L1: arm length 1 of the lever (from the shaft 408 to the pressing plate contact portion 409)
L2: arm length 2 of the lever (from the shaft 408 to the valve portion 407)
R: flow resistance of the gap 413 between the valve portion 407 and the outflow port 410
Q: liquid flow rate In this case, for simplicity, the pressure in the valve chamber 402 is equal to the pressure in the first liquid storage chamber 401. A flow resistance R of the gap 413 between the valve portion 407 and the outflow port 410 changes depending on an amount of the gap 413. By determining the amount of the gap 413 so that the above expressions (1) and (2) simultaneously hold true, P1 is derived. For example, if the liquid flow rate Q that flows into the pressure control unit increases, the result is as follows. Due to pressure characteristics corresponding to the flow rate of the second circulation pump 1004 placed downstream of the pressure control unit, and an increase in the flow resistance of a path from the second liquid storage chamber 403 to the second circulation pump 1004, P2 increases (comes close to a positive pressure). If P2 increases, P1 instantaneously decreases as represented by the expression (1). Meanwhile, as represented by the expression (2), Q and P2 increase while P1 decreases. Thus, R decreases. Thus, the valve 406 moves to pivot (makes a pivoting displacement) in the direction in which the gap 413 between the valve portion 407 and the outflow port 410 increases. As a result of the displacement, the spring on the valve side is displaced in a direction in which a length of the spring decreases. Thus, F2 increases. Conversely, the spring on the pressing plate 404 side is displaced in a direction in which a length of the spring increases. Thus, F1 decreases. At this time, the pressing plate 404 is displaced in the direction in which the inner volume of the first liquid storage chamber 401 increases. As a result, as represented by the expression (1), P1 instantaneously increases. If P1 increases, P2 instantaneously decreases by action opposite to the above. The phenomenon is intermittently repeated in a short period, and R changes depending on the flow rate Q while both the expressions (1) and (2) hold true. As a result, P1 is controlled to be a pressure within a certain range.

The first liquid storage chamber 401 communicates with the common collection flow channel 2211 and the discharge modules 2200 through the inflow port 414. More specifically, P1 is controlled to be a pressure within the certain range, whereby the pressure in the discharge modules 2200 involved in the discharge of the liquid is controlled to be within a certain range. The gap 413 between the valve portion 407 and the outflow port 410 has great relevance to the pressure control of P1. For example, a case is cited where the valve portion 407 and the outflow port 410 are in a positional relationship in which the valve portion 407 is significantly inclined relative to the outflow port 410. In this case, it is not possible to form the gap 413 between the valve portion 407 and the outflow port 410 that provides R with which both of the above two expressions hold true. Thus, P1 is not controlled to be the pressure within the certain range.

While a description has been given using the valve 406 including the valve portion 407 and the pressing plate contact portion 409 at both ends and the shaft 408 at the center thereof, the exemplary embodiment of the present disclosure is not limited to this configuration. For example, a valve that moves to make a pivoting displacement about a shaft at one end thereof can also be used. Furthermore, the valve is not limited to a valve that pivots. A configuration can also be used in which the gap 413 between the valve portion 407 and the outflow port 410 changes by linear displacement. The valve opening degree of the outflow port 410 indicates ease of the flow of liquid taking into account a resistance in the outflow port 410. If the gap 413 in the outflow port 410 becomes large, the valve opening degree becomes high. The valve opening degree also becomes high if the opening area of the outflow port 410 becomes large. The valve opening degree also becomes high if a state where the outflow port 410 is closed with the valve 406 (valve opening degree is 0%) changes to a state where the valve 406 moves and at least part of the outflow port 410 opens.

It is desirable that in the pressure control unit, the direction of the motion of the valve be different from the direction of the motion of the flexible film. If the direction of the motion of the flexible film and the direction of the motion of the valve are the same, the motions of the flexible film and the pressing plate are likely to be directly influenced by the limitation of the range of movement of the valve by the members other than the pressing plate. Thus, there is a case where the flexible film or the pressing plate is unlikely to make a desired motion. In contrast, if the direction of the motion of the flexible film and the direction of the motion of the valve are different from each other, the motion of the flexible film or the pressing plate is unlikely to be directly influenced by the limitation of the range of movement of the valve by the members other than the pressing plate. Thus, the flexible film or the pressing plate is likely to make a desired motion.

It is desirable that the pressure control unit have a configuration in which the flexible film and the pressing plate linearly move, and the motion of the valve to be made in conjunction with the linear movement be a pivoting movement. If the motion of the valve is the pivoting movement, it is easy to limit the range of movement of the valve by the members other than the pressing plate, for example, by fixing the axis of the pivoting movement. In particular, in a configuration in which the outflow port is provided above the axis of the pivoting movement of the valve in the vertical direction, it is more desirable that the motion of the valve be the pivoting movement. If the motion of the valve is the pivoting movement, when the valve opening degree becomes high, a gap width between the valve and the outflow port is wider above in the vertical direction than below in the vertical direction. If the gap width is wider above in the vertical direction than below in the vertical direction, an effect is obtained where the air, which is likely to be accumulated above in the vertical direction, is easily caused to flow out of the outflow port through the gap.

While the valve opening degree of the outflow port 410 has been described using a change in the flow resistance depending on the amount of the gap 413 in a direction in which the valve portion 407 and the outflow port 410 are opposed to each other, the exemplary embodiment of the present disclosure is not limited to this configuration. For example, a configuration may be employed in which the valve portion 407 is displaced to change the opening area of the outflow port 410, whereby the flow resistance changes. In either case, the range of movement of the valve 406 according to the exemplary embodiment of the present disclosure is limited by the members other than the pressing plate 404, whereby the flexible film 405 is unlikely to influence control of the pressure of liquid by the valve 406.

Figure 17A:
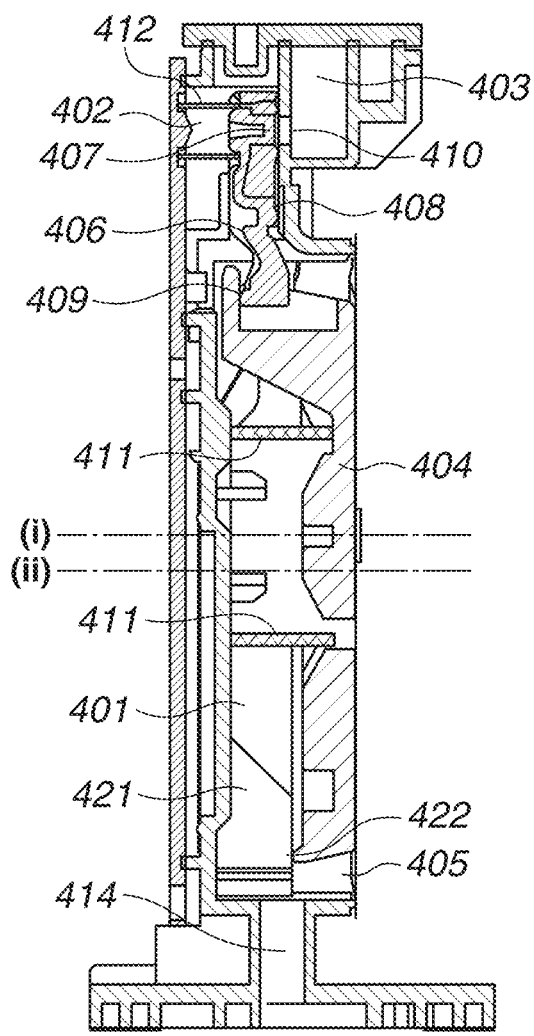
FIGS. 17A and 17B are diagrams illustrating movements of the pressing plate and the valve.
Figure 17B:
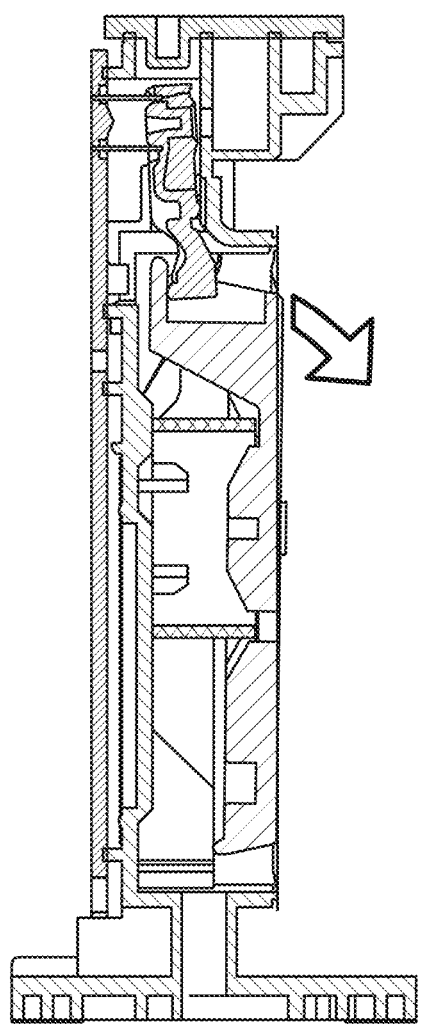

Next, with reference to FIGS. 17A and 17B, an example is described where the pressing plate 404 and the valve 406 make movements different from those in the example described with reference to FIGS. 14A and 14B. In the example illustrated in FIGS. 17A and 17B, the pressing plate 404 moves to pivot in the direction of increasing the inner volume of the first liquid storage chamber 401. In FIG. 17A, an axis located at the center in the vertical direction of the negative pressure spring 411 as an urging member placed in the first liquid storage chamber 401 (and orthogonal to the vertical direction) is indicated by an axis (i). An axis located at the center in the vertical direction of a movable portion of the first liquid storage chamber 401, which is constituted of the flexible film 405 and the pressing plate 404, (and orthogonal to the vertical direction) is indicated by an axis (ii). As illustrated in FIG. 17A, the axis (i) is placed above the axis (ii) in the vertical direction. Below the pressing plate 404 in the vertical direction, a pressing plate projection 422 is provided. At a position opposed to the pressing plate projection 422 in the first liquid storage chamber 401, a pressing plate regulation portion 421 is provided. The pressing plate regulation portion 421 regulates displacement of the pressing plate projection 422 in a length direction (extending direction) of the negative pressure spring 411 by the pressing plate projection 422 of the pressing plate 404 coming into contact with the pressing plate regulation portion 421 when the movable portion of the first liquid storage chamber 401 is displaced. In such placement, as illustrated in FIG. 17B, when the pressing plate 404 moves in the direction of increasing the inner volume of the first liquid storage chamber 401, the movable portion of the first liquid storage chamber 401 moves to make a pivoting displacement in a direction indicated with an arrow. More specifically, based on a relationship of force balance between the pressure in the first liquid storage chamber 401 and the negative pressure spring 411, the movable portion of the first liquid storage chamber 401 makes the pivoting displacement about the pressing plate projection 422 from the state where the pressing plate projection 422 is in contact with the pressing plate regulation portion 421. In such a configuration, the states of the flexible film 405 and the pressing plate 404 of the first liquid storage chamber 401 when the valve 406 is opened are regulated to the state where the pressing plate projection 422 is in contact with the pressing plate regulation portion 421. Thus, the force of the negative pressure spring 411 pressing the pressing plate 404 when the valve 406 is opened can also be made constant. As described above, the pressing force of the negative pressure spring 411 is a parameter for determining the pressure in the first liquid storage chamber 401. Thus, if the pressing force of the negative pressure spring 411 becomes constant, the pressure in the first liquid storage chamber 401 can also be made constant. The states of the flexible film 405 and the pressing plate 404 of the first liquid storage chamber 401 when the valve 406 is opened are regulated to the state where the pressing plate projection 422 is in contact with the pressing plate regulation portion 421. Consequently, when the valve 406 is opened, the deformed states of the flexible film 405 and the pressing plate 404, which constitute the movable portion of the first liquid storage chamber 401, become constant. In other words, pressure reception area of the movable portion is constant. As described above, the pressure reception area of the movable portion is a parameter for determining the pressure in the first liquid storage chamber 401. Thus, if the pressure reception area of the movable portion becomes constant, the pressure in the first liquid storage chamber 401 can also be made constant.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-019538, filed Feb. 6, 2019, which is hereby incorporated by reference herein in its entirety.

What is claimed is:

1. A pressure control unit comprising:
   a liquid storage chamber configured to store liquid;
   an inflow port configured to allow the liquid to flow into the liquid storage chamber, and an outflow port configured to allow the liquid to flow out of the liquid storage chamber, the pressure control unit controlling pressure of the liquid,
   wherein at least part of an outer wall of the liquid storage chamber is formed of a flexible film;
   a pressing plate configured to press the flexible film in a direction of expanding the liquid storage chamber;
   an urging member configured to urge the pressing plate in a direction in which the pressing plate presses the flexible film; and
   a valve configured to open and close the outflow port,
   wherein the pressing plate presses the flexible film and moves in the direction of expanding the liquid storage chamber, whereby the valve in contact with the pressing plate moves and makes a valve opening degree of the outflow port high, and
   wherein a range of motion of the valve when making the valve opening degree of the outflow port high is limited by a member other than the pressing plate.

2. The pressure control unit according to claim 1, wherein the motion of the valve when making the valve opening degree of the outflow port high is a pivoting movement.

3. The pressure control unit according to claim 1, wherein motion of the pressing plate when pressing the flexible film and moving in the direction of expanding the liquid storage chamber is linear, and the motion of the valve when making the valve opening degree of the outflow port high is a pivoting movement.

4. The pressure control unit according to claim 1, wherein the inflow port is formed below the liquid storage chamber in a vertical direction.

5. The pressure control unit according to claim 1, wherein the outflow port is formed above the liquid storage chamber in a vertical direction.

6. The pressure control unit according to claim 1, wherein the outflow port is formed above the part of the outer wall of the liquid storage chamber formed of the flexible film, in a vertical direction.

7. The pressure control unit according to claim 1, wherein a shape of a pressing plate contact portion included in the valve and configured to come into contact with the pressing plate, is at least part of a spherical shape.

8. The pressure control unit according to claim 7, wherein the shape of the pressing plate contact portion included in the valve and configured to come into contact with the pressing plate is a hemispherical shape.

9. The pressure control unit according to claim 1, further comprising:
   a second liquid storage chamber different from the first liquid storage chamber, in a case where the liquid storage chamber is a first liquid storage chamber,
   wherein the outflow port is formed between the first and second liquid storage chambers.

10. A liquid discharge device comprising:
    a pressure control unit including,
    a liquid storage chamber configured to store liquid, an inflow port configured to allow the liquid to flow into the liquid storage chamber, and an outflow port configured to allow the liquid to flow out of the liquid storage chamber, the pressure control unit controlling pressure of the liquid, wherein at least part of an outer wall of the liquid storage chamber is formed of a flexible film, a pressing plate configured to press the flexible film in a direction of expanding the liquid storage chamber, an urging member configured to urge the pressing plate in a direction in which the pressing plate presses the flexible film, and a valve configured to open and close the outflow port, wherein the pressing plate presses the flexible film and moves in the direction of expanding the liquid storage chamber, whereby the valve in contact with the pressing plate moves and makes a valve opening degree of the outflow port high, and wherein a range of motion of the valve when making the valve opening degree of the outflow port high is limited by a member other than the pressing plate; and a liquid discharge head including a plurality of discharge ports and configured to discharge liquid from the discharge ports.

11. The liquid discharge device according to claim 10, wherein the liquid discharge head includes at least a pair of common flow channels and a plurality of individual flow channels configured to connect one of the pair of common flow channels and the other of the pair of common flow channels and communicate with the plurality of discharge ports, wherein the pressure control unit includes, in a case where the liquid storage chamber is a first liquid storage chamber, a second liquid storage chamber different from the first liquid storage chamber, wherein the outflow port is formed between the first and second liquid storage chambers, and wherein the second liquid storage chamber is provided downstream of the first liquid storage chamber in a flow of the liquid.

* * * * *